United States Patent
Bordawekar et al.

(10) Patent No.: US 11,934,401 B2
(45) Date of Patent: Mar. 19, 2024

(54) SCALABLE COUNT BASED INTERPRETABILITY FOR DATABASE ARTIFICIAL INTELLIGENCE (AI)

(71) Applicant: International Business Machines Corporation, Armonk, NY (US)

(72) Inventors: Rajesh Bordawekar, Millwood, NY (US); Prabhakar Kudva, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/817,428

(22) Filed: Aug. 4, 2022

(65) Prior Publication Data
US 2024/0045866 A1   Feb. 8, 2024

(51) Int. Cl.
  *G06F 16/2453*  (2019.01)
  *G06F 16/22*  (2019.01)
  *G06F 16/248*  (2019.01)

(52) U.S. Cl.
  CPC .... *G06F 16/24549* (2019.01); *G06F 16/2255* (2019.01); *G06F 16/248* (2019.01)

(58) Field of Classification Search
  CPC ..... G06F 16/283; G06F 16/2228; G06F 16/24
  USPC .......................................................... 707/722
  See application file for complete search history.

(56) References Cited

U.S. PATENT DOCUMENTS

| | | | |
|---|---|---|---|
| 7,751,325 B2 | 7/2010 | Krishnamurthy et al. |
| 7,895,194 B2 | 2/2011 | Indyk et al. |
| 9,578,046 B2 | 2/2017 | Baker |
| 9,594,741 B1 | 3/2017 | Thakurta et al. |

(Continued)

FOREIGN PATENT DOCUMENTS

| | | |
|---|---|---|
| CN | 106657038 B | 12/2019 |
| CN | 113098848 A | 7/2021 |

(Continued)

OTHER PUBLICATIONS

Goyal, et al., "Sketch Algorithms for Estimating Point Queries in NLP," Proceedings of the 2012 Joint Conference on Empirical Methods in Natural Language Processing and Computational Natural Language Learning, http://dimacs.rutgers.edu/~graham/pubs/papers/nlpsketch.pdf. (pp. 1093-1103).

(Continued)

*Primary Examiner* — Hung T Vy
(74) *Attorney, Agent, or Firm* — Amin, Turocy & Watson, LLP

(57) ABSTRACT

Systems, computer-implemented methods or computer program products to facilitate receiving results of a semantic structured query language (SQL) query and employing sparse hash-table based sketches to interpret a semantic structured query language (SQL) query result. A computing component stores a first space-efficient structure sketch in a compressed serialize form. The computing component can load a second space-efficient data structure sketch along with the first space-efficient data structure sketch and can compute one or more interpretability scores by extracting co-occurrence information from the first space-efficient data structure sketch. The second space-efficient data structure sketch can include a sketch for containment check.

20 Claims, 14 Drawing Sheets

(56) References Cited

U.S. PATENT DOCUMENTS

| | | | |
|---|---|---|---|
| 9,747,363 B1* | 8/2017 | Smith | G06F 12/0223 |
| 10,268,749 B1 | 4/2019 | Roy et al. | |
| 11,119,995 B2 | 9/2021 | Ponnala et al. | |
| 2003/0204499 A1* | 10/2003 | Shahabi | G06F 16/24556 |
| 2018/0074745 A1 | 3/2018 | Harnik et al. | |
| 2021/0360088 A1 | 11/2021 | Ponnala et al. | |

FOREIGN PATENT DOCUMENTS

| | | |
|---|---|---|
| CN | 108304409 B | 11/2021 |
| CN | 112437037 B | 12/2021 |

OTHER PUBLICATIONS

Penman, "Sparsehash Internals," https://tristanpenman.com/blog/posts/2017/10/11/sparsehash-internals/, Oct. 11, 2017.
Bordawekar, et al., "Cognitive database: A step towards endowing relational databases with artificial intelligence capabilities," arXiv:1712.07199v1 [cs.DB] Dec. 19, 2017.
Cormode, et al., "An improved data stream summary: the count-min sketch and its applications," J. Algorithms, 55(1):58-75, 2005.
Danilevsky, et al., "A survey of the state of explainable AI for natural language processing," arXiv:2010.00711v1 [cs.CL] Oct. 1, 2020.
Gan, et al., "Semglove: Semantic co-occurrences for glove from BERT," rXiv:2012.15197v2 [cs.CL] Nov. 24, 2021.
Gilpin, et al., "Explaining explanations: An approach to evaluating interpretability of machine learning," arXiv:1806.00069v3 [cs.AI] Feb. 3, 2019.
Goyal, et al., "Sketching techniques for large scale NLP," In Proceedings of the NAACL HLT 2010 Sixth Web as Corpus Workshop, pp. 17-25, NAACL-HLT, Los Angeles, Jun. 2010. Association for Computational Linguistics.
Koc, et al., "Imparting interpretability to word embeddings," arXiv:1807.07279v4 [cs.CL] Jul. 2, 2020.
Mikolov, et al., "Efficient estimation of word representations in vector space," arXiv:1301.3781v3 [cs.CL] Sep. 7, 2013.
Molnar, et al., "Interpretable Machine Learning: A Guide for Making Black Box Models Explainable," (2022), christophm.github.io/interpretable-ml-book/, 2022 (pp. 1-126).
Molnar, et al., "Interpretable Machine Learning: A Guide for Making Black Box Models Explainable," (2022), christophm.github.io/interpretable-ml-book/, 2022 (pp. 127-254).
Pennington, et al., "Glove: Global vectors for word representation," In EMNLP, vol. 14, pp. 1532-1543, 2014.
Pitel, et al., "Count-min-log sketch: Approximately counting with approximate counters," arXiv:1502.04885v1 [cs.IR] Feb. 17, 2015.
Rinberg, et al., "Fast concurrent data sketches," arXiv:1902.10995v2 [cs.DS] Dec. 5, 2019.
Senel, et al., "Semantic structure and interpretability of word embeddings," arXiv:1711.00331v3 [cs.CL] May 16, 2018.
Tjoa, et al., "A survey on explainable artificial intelligence (xai): Toward medical xai," IEEE transactions on neural networks and learning systems, 32.11, 2020.
Zhang, et al., "Improving interpretability of word embeddings by generating definition and usage," arXiv:1912.05898v2 [cs.CL] Jul. 18, 2020.
Mell et al., The NIST Definition of Cloud Computing, Recommendations of the National Institute of Standards and Technology, NIST Special Publication 800-145, Sep. 2011, 7 pages.

* cited by examiner

← 300

```
Procedure InterpretQueryResults
  input  : Query, Results, SelCols
  output:
   CRankedQuery ← InfTokens(Query, SelCols);
   i ← 0 ;
   foreach result r ∈ Results do
       CRankedRes[i] ← InfTokens(r, SelCols);
       PRINT(Query, Result);
       PRINT(CRankedRes[i] ∩ CRankedQuery);
       i ← i + 1;
```

← 302

```
Procedure InfTokenss
    input : OneQuery, SelCols
1   foreach selectedcolumn sc ∈ selcols do
2       scvals ← LoadUniqueVals(sc);
3       ups ← null;
4       foreach scalue scval ∈ scvals do
5           ups.append(concat(scval OneQuery));

6   countdict ← null;
7   foreach uniquepair up ∈ ups do
8       countdict.add(pair(up, QuerySketch(up)));
9   return sorted(countdict, num);
```

```
CUSTOMERID!!7590_VHVEG GENDER!!FEMALE SENIORCITIZEN!!0 PARTNER!!YES DEPENDENTS!!NO
TENURE!!c0 PHONESERVICE!!NO MULTIPLELINES!!NO_PHONE_SERVICE INTERNETSERVICE!!DSL
ONLINESECURITY!!NO ONLINEBACKUP!!YES DEVICEPROTECTION!!NO TECHSUPPORT!!NO
STREAMINGTV!!NO STREAMINGMOVIES!!NO CONTRACT!!MONTH_TO_MONTH PAPERLESSBILLING!!YES
PAYMENTMETHOD!!ELECTRONIC_CHECK MONTHLYCHARGES!!c0 TOTALCHARGES!!c0 CHURN!!NO
CUSTOMERID!!7590_vhveg GENDER!!MALE SENIORCITIZEN!!0 PARTNER!!NO DEPENDENTS!!NO TENURE!!c2
PHONESERVICE!!YES MULTIPLELINES!!NO INTERNETSERVICE!!DSL ONLINESECURITY!!YES
ONLINEBACKUP!!NO DEVICEPROTECTION!!YES TECHSUPPORT!!NO STREAMINGTV!!NO
STREAMINGMOVIES!!NO CONTRACT!!ONE_YEAR PAPERLESSBILLING!!NO
PAYMENTMETHOD!!MAILED_CHECK MONTHLYCHARGES!!c1
TOTALCHARGES!!c1 CHURN!!NO
CUSTOMERID!!3668_QPYBK GENDER!!MALE SENIORCITIZEN!!0 PARTNER!!NO DEPENDENTS!!NO
TENURE!!c0 PHONESERVICE!!YES MULTIPLELINES!!NO INTERNETSERVICE!!DSL ONLINESECURITY!!YES
ONLINEBACKUP!!YES DEVICEPROTECTION!!NO TECHSUPPORT!!NO STREAMINGTV!!NO
STREAMINGMOVIES!!NO CONTRACT!!MONTH_TO_MONTH PAPERLESSBILLING!!YES
PAYMENTMETHOD!!MAILED_CHECK MONTHLYCHAR
GES!!c1 TOTALCHARGES!!c0 CHURN!!NO
CUSTOMERID!!7795_CFOCW GENDER!!MALE SENIORCITIZEN!!0 PARTNER!!NO DEPENDENTS!!NO
TENURE!!c3 PHONESERVICE!!NO MULTIPLELINES!!NO_PHONE_SERVICE INTERNETSERVICE!!DSL
ONLINESECURITY!!YES ONLINEBACKUP!!NO DEVICEPROTECTION!!YES TECHSUPPORT!!YES
STREAMINGTV!!NO STREAMINGMOVIES!!NO CONTRACT!!ONE_YEAR PAPERLESSBILLING!!NO
PAYMENTMETHOD!!BANK_TRANSFER_AUTOMATIC MONTHLYCHARGES!!c1 TOTALCHARGES!!c1
CHURN!!NO
CUSTOMERID!!9237_HQITU GENDER!!FEMALE SENIORCITIZEN!!0 PARTNER!!NO DEPENDENTS!!NO
TENURE!!c0 PHONESERVICE!!YES MULTIPLELINES!!NO INTERNETSERVICE!!FIBER_OPTIC
ONLINESECURITY!!NO ONLINEBACKUP!!NO DEVICEPROTECTION!!NO TECHSUPPORT!!NO
 STREAMINGTV!!NO STREAMINGMOVIES!!NO CONTRACT!!MONTH_TO_MONTH PAPERLESSBILLING!!YES
PAYMENTMETHOD!!ELECTRONIC_CHECK MONTHLYCHARGES!!c2 TOTALCHARGES!!c0 CHURN!!YES
CUSTOMERID!!9305_CDSKC GENDER!!FEMALE SENIORCITIZEN!!0 PARTNER!!NO DEPENDENTS!!NO
TENURE!!c1 PHONESERVICE!!YES MULTIPLELINES!!YES INTERNETSERVICE!!FIBER_OPTIC
ONLINESECURITY!!NO ONLINEBACKUP!!NO DEVICEPROTECTION!!YES TECHSUPPORT!!NO
STREAMINGTV!!YES STREAMINGMOVIES!!YES CONTRACT!!MONTH_TO_MONTH
PAPERLESSBILLING!!YES PAYMENTMETHOD!!MAILED_CHECK MONTHLYCHARGES!!c3
TOTALCHARGES!!c0 CHURN!!YES
CUSTOMERID!!8091_TTVAX GENDER!!MALE SENIORCITIZEN!!0 PARTNER!!YES DEPENDENTS!!NO
TENURE!!c4 PHONESERVICE!!YES MULTIPLELINES!!YES INTERNETSERVICE!!FIBER_OPTIC
ONLINESECURITY!!NO ONLINEBACKUP!!NO DEVICEPROTECTION!!YES TECHSUPPORT!!NO
STREAMINGTV!!YES STREAMINGMOVIES!!YES CONTRACT!!ONE_YEAR PAPERLESSBILLING!!NO
PAYMENTMETHOD!!CREDIT_CARD_AUTOMATIC MONTHLYCHARGES!!c3 TOTALCHARGES!!c3 CHURN!!NO
CUSTOMERID!!0280_XJGEX GENDER!!MALE SENIORCITIZEN!!0 PARTNER!!NO DEPENDENTS!!NO
TENURE!!c3 PHONESERVICE!!YES MULTIPLELINES!!YES INTERNETSERVICE!!FIBER_OPTIC
ONLINESECURITY!!NO ONLINEBACKUP!!YES DEVICEPROTECTION!!YES TECHSUPPORT!!NO
STREAMINGTV!!YES STREAMINGMOVIES!!YES CONTRACT!!MONTH_TO_MONTH
PAPERLESSBILLING!!YES
PAYMENTMETHOD!!MAILED_CHECK MONTHLYCHARGES!!c3 TOTALCHARGES!!c3 CHURN!!YES
```

FIG. 4A

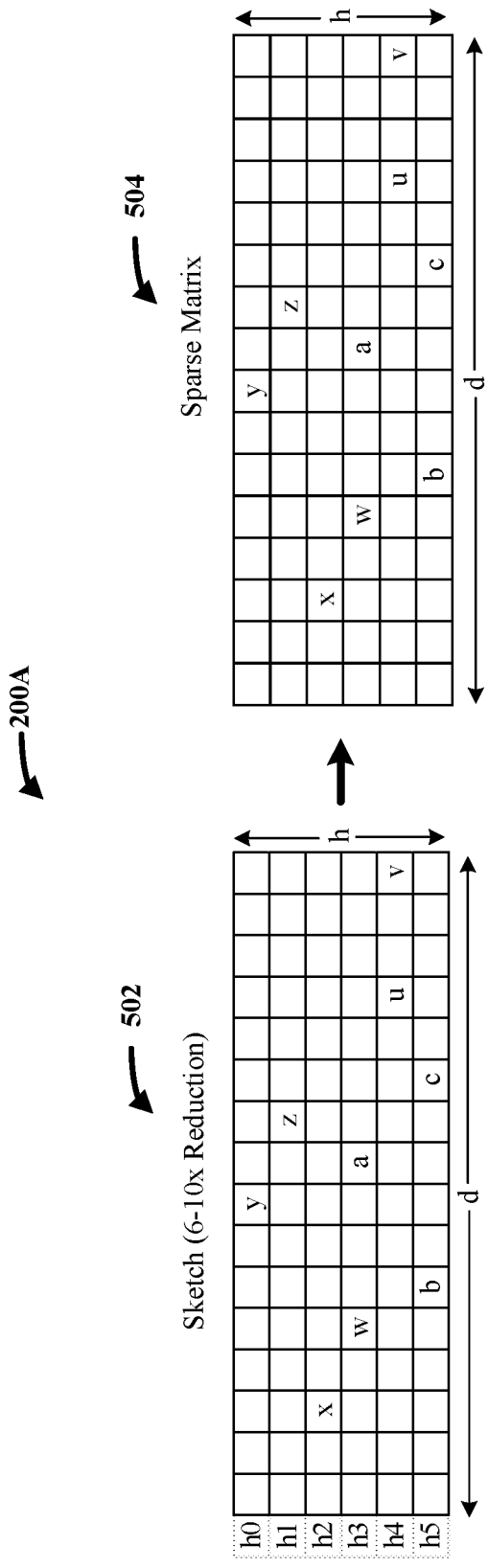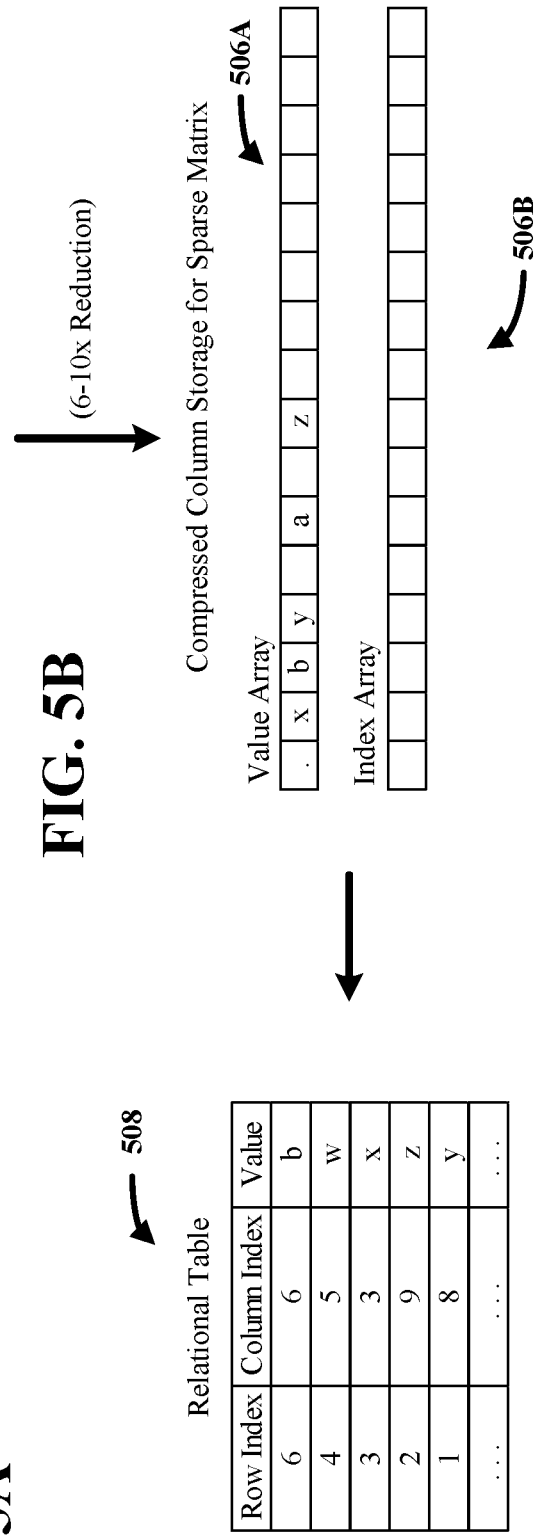
FIG. 5A
FIG. 5B
FIG. 5C
FIG. 5D

← 900

```
Procedure MultiprocessCreateSketch
  input  : TrainingFile, n
  output: Sketch
   ThreadTrainingFiles ← Split(TrainingFile, n);
   i ← 0 ;
   foreach ThreadTrainingFile ∈ ThreadTrainingFiles
    do
       SketchThread[i] ←
         CreateSketch(ThreadTrainingFile);
       i ← i + 1;
   Sketch = MergeSketchTableEntries(SketchThread[i]);
   return Sketch;
```

FIG. 9

Unique Co-occurring Token Pairs (1000)

| Dataset | Unique Token Pairs |
|---|---|
| Telco Customer Churn | 1527 |
| Fannie Mae | 202499 |
| Virginia | 1067565 |
| Credit Card Fraud | 10271049 |
| CA Toxicity | 13320509 |
| AML | 218388786 |

Count Sketch Statistics (1002)

| Dataset | Database Rows | Sketch Width | Sketch Depth | Sparse Percent |
|---|---|---|---|---|
| Telco Customer Churn | 7043 | 30000 | 5 | 99.8 |
| Fannie Mae | 11232359 | 8000000 | 5 | 92.8 |
| Virginia | 1371968 | 8000000 | 5 | 75.8 |
| Credit Card Fraud | 26925910 | 8000000 | 5 | 7.4 |
| CA Toxicity | 1248836 | 8000000 | 12 | 15.2 |
| AML | 37723447 | 8000000 | 12 | 0 |

Thresholding Sparsity Improvements (1004)

| Dataset | Sparsity Improvement |
|---|---|
| Telco Customer Churn | 12 |
| Virginia | 85 |
| CA Toxicity | 80 |
| Credit Card Fraud | 78 |
| AML | 0.02 |

Multiprocessing Improvements (1006)

| Dataset | Number Threads | Speedup |
|---|---|---|
| Credit Card Fraud | 4 | 1.6 |
| Fannie Mae | 6 | 3.8 |
| AML | 12 | 5.8 |

FIG. 10

SCALABLE COUNT BASED INTERPRETABILITY FOR DATABASE ARTIFICIAL INTELLIGENCE (AI)

BACKGROUND

One or more embodiments described herein relate generally to count based interpretability for artificial intelligence (AI) databases. Embodiments relate to interpretation upon receipt of a semantic structured query language (SQL) query, and more specifically, employing sparse hash-table based sketches to interpret semantic SQL query results.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus or computer program products are described that can facilitate the interpretation of one or more semantic SQL query results.

According to an embodiment, a system can comprise a memory that stores computer executable components and a processor that executes the computer executable components stored in the memory. The computer executable components can include a receiving component that receives results of a semantic structured query language (SQL) query. Further, the computer executable components can include a computing component that employs sparse hash-table based sketches to interpret the semantic SQL query result.

According to another embodiment, a computer-implemented method can comprise receiving, using a processor operatively coupled to memory, results of a semantic SQL query. The computer-implemented method can also comprise employing, using the processor, sparse hash-table based sketches to interpret the semantic SQL query result.

According to yet another embodiment, a computer program product for interpreting semantic structured query results, the computer program product can comprise a computer readable storage medium having program instructions embodied therewith, the program instructions executable by a processor can cause the processor to receive, by the processor, results of a semantic structured query language (SQL) query. The program product for interpreting semantic structured query results can employ, by the processor, sparse hash-table based sketches to interpret the semantic SQL query result.

In one or more embodiments of the above system, computer program product or method can comprise a storage component that stores a first space-efficient data structure sketch in a compressed serialized form. Further, the computing component can load a second space-efficient data structure sketch along with the first space-efficient data structure sketch or the computing component can compute one or more interpretability score by extracting co-occurrence information from the first space-efficient data structure sketch. Additionally, the second space-efficient data structure sketch can include a sketch for containment check. The system, computer program product or method can determine one or more interpretability scores via the co-occurrence scores from the first space-efficient data structure sketch and Boolean containment values from the second space-efficient data structure sketch.

According to further embodiments, the system, computer program product or method can extract the co-occurrence information from an input source. The system, computer program product or method can update the first space-efficient data structure or the second space-efficient data structure via the extracted co-occurrence information. For example and without limitation, the first space-efficient data structure sketch can be a sparse count sketch or the second space-efficient data structure sketch can be a sparse sketch.

DESCRIPTION OF THE DRAWINGS

FIG. 3 illustrates portions of an algorithm utilized for employing sparse hash-table based sketches to interpret semantic SQL query results, in accordance with one or more embodiments described herein.

FIG. 4A illustrates portions of textified data with bi-gram tuples highlighted for which co-occurrences are computed, in accordance with one or more embodiments described herein.

FIG. 5A illustrates a diagram of a first space-efficient data structure sketch, in accordance with one or more embodiments described herein.

FIG. 5B illustrates a diagram of a first space-efficient data structure sketch as a sparse matrix sketch, in accordance with one or more embodiments described herein.

FIG. 5C illustrates a compressed column storage for sparse matrix of the first space-efficient data structure sketch, in accordance with one or more embodiments described herein.

FIG. 5D illustrates a relational table of the first space-efficient data structure sketch, in accordance with one or more embodiments described herein.

FIG. 9 illustrates a portion of an algorithm utilized for executing via multiprocessing a method that facilitates employing hash-table based sketches to interpret semantic SQL query results, in accordance with one or more embodiments described herein.

FIG. 10 illustrates a variety of tables illustrating experimentation results for an example, non-limiting computer implemented method that facilitates employing hash-table based sketches to interpret semantic SQL query results, in accordance with one or more embodiments described herein.

DETAILED DESCRIPTION

The following detailed description is merely illustrative and is not intended to limit embodiments or application or uses of embodiments. Furthermore, there is no intention to be bound by any expressed or implied information presented in the preceding Background or Summary sections, or in this Detailed Description section.

With reference to AI-Database (e.g., AI-DB) systems and methods, it will be appreciated that AI-DB systems/methods can enable a close connection between database systems and AI techniques (e.g., more so than in typical database connection without AI integration). However, interpretability techniques can face memory or runtime challenges as database sizes increase in scale. Given the aforementioned problem with database scaling, providing count-based interpretability can be utilized to facilitate database scaling while providing sufficient interpretability to AI results.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, one or more embodiments can be practiced without these specific details.

Figure 1:
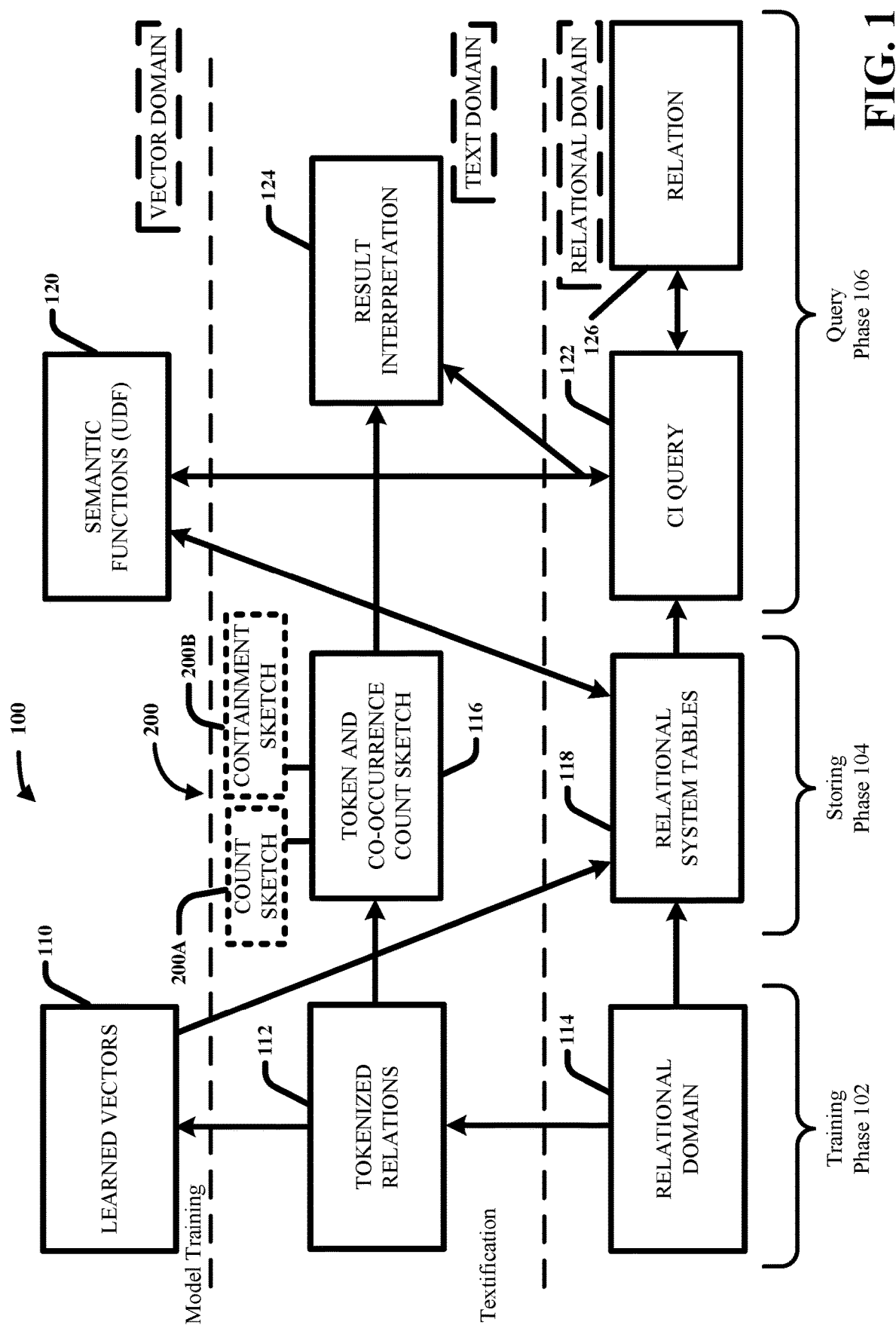
FIG. 1 illustrates a block diagram of an example, non-limiting system that facilitates employing sparse hash-table based sketches to interpret semantic SQL query results, in accordance with one or more embodiments described herein.
Figure 2:
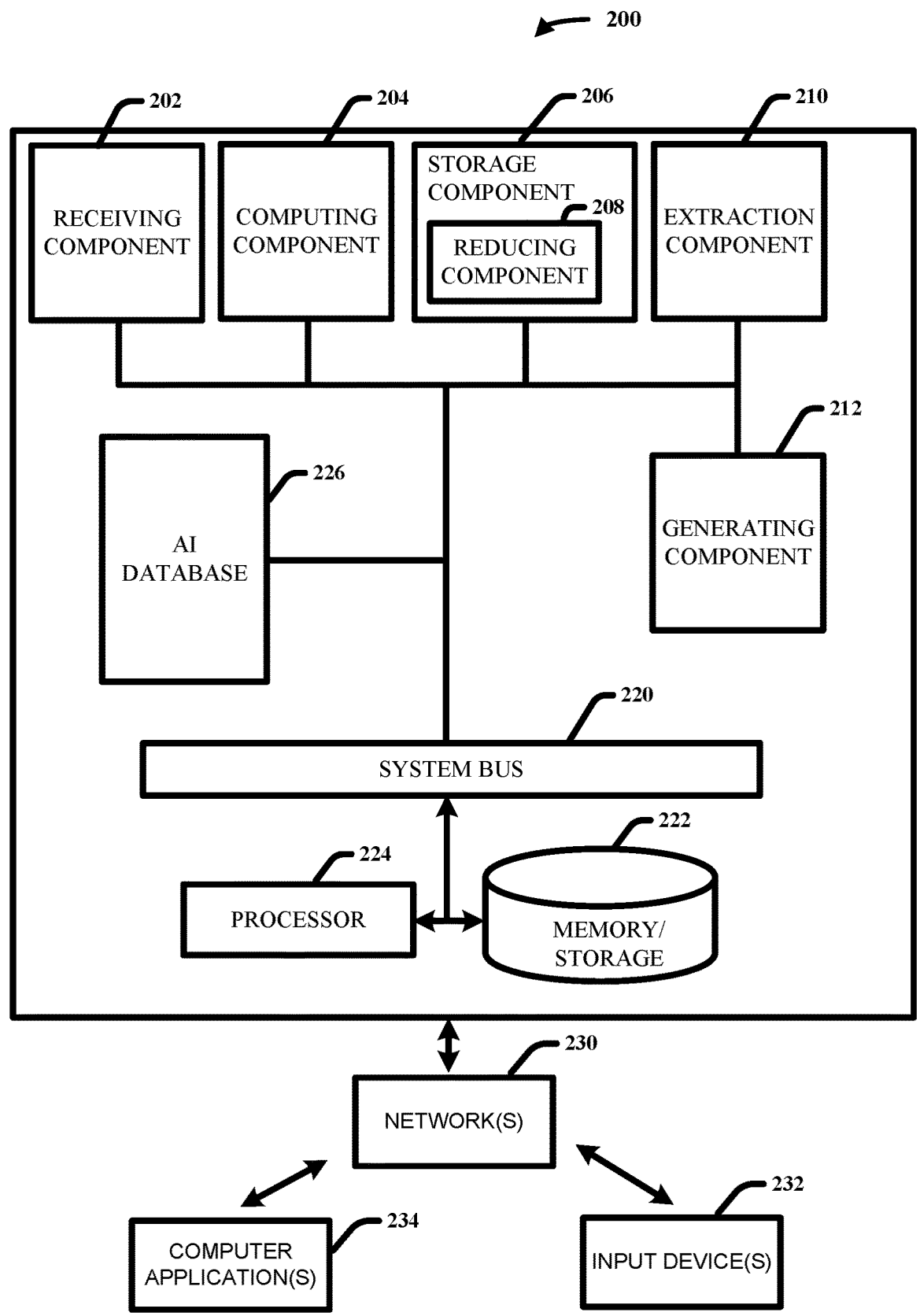
FIG. 2 illustrates a block diagram of an example, non-limiting system that facilitates employing sparse hash-table based sketches to interpret semantic SQL query results, in accordance with one or more embodiments described herein.

In one or more embodiments of the above system, a computer program product or method, can operate within an AI-DB (e.g., the AI-powered database framework) 100 as shown in top-level block diagram FIG. 1. The AI-DB 100 (e.g., the AI-DB framework) can include one or more phases in execution flow (e.g., three phases). The one or more phases can include (1) a training phase 102, (2) a storing phase 104, or (3) a query phase 106. The training phase 102 can occur when a database trains a model. For example and without limitation, the training phase 102 can be omitted when using a pre-trained model. The training phase 102 can include steps of (1) using meaningful unstructured text representation of the structured relational data as input to the training process or (2) using a self-supervised vector embedding technique to generate meaning vectors from an input text corpus (e.g., as indicated by flowchart blocks: learned vectors 110, tokenized relations 112, and relational domain 114). AI-DB methodologies can be modified to address various subtleties with a relational data model shown in FIG. 1. The training phase 102 can associate unique token(s) from an input corpus with a vector of dimension d. For example, a token can be a unique string value in an AI-DB field including a row, column location. The vectors can be stored to be used for inference (e.g., the storing phase 104). The storing phase 104 can include textification (e.g., conversion of an AI-DB table into text entries). For example, unique fields in a column can be converted into categorical string; or numerical value can be converted into strings via clustering or assigned categorical values (e.g., as indicated by flowchart blocks: token and co-occurrence count sketch 116 and relational system tables 118). Further, in view of the above semantic SQL interpretation system, computer program product or method 200, the system/computer program product/method 200 can operate within flowchart blocks: token and co-occurrence count sketch 116, relational system tables 118, cognitive intelligence (CI) query 122, or result interpretation 124 (e.g., a process that can be executed by the system 200 to compare the CI query 122 with the token and co-occurrence count sketch 116) Details illustrating the semantic SQL interpretation system 200 are further illustrated in subsequent FIG. 2. FIG. 2 illustrates a non-limiting embodiment of the semantic SQL interpretation system 200 that can comprise a receiving component 202, a computing component 204, a storage component 206, a recuing component 208, an extraction component 210, or a generating component 212. The semantic SQL interpretation system 200 can receive results of a semantic SQL query, and employ sparse hash-table based sketches to interpret the semantic SQL query result via the computing component 204.

Turning back to FIG. 1, in embodiments, such as in the query phase 106, a query execution engine/process (e.g., a query comparison function of the processor that can be executed at result interpretation 124) can use various semantic functions 120 that can fetch the trained vectors as needed, or use the learned/trained vectors to implement semantic contextual computations in various CI queries 122. For example, a CI query 122 can be defined as presenting a query token to the AI-DB 100 to find other tokens that are most closely related based on criteria (e.g., embedding similarity, semantic, or analogy). A token can be defined as a unique string value in a database field. Further, it is to be appreciated that CI queries 122 can be restricted by columns or can be provided additional constraints. The query phase 106 can include flowchart blocks: semantic functions 120, CI query 122, interpretation 124, and relation 126.

Additionally or alternatively, in embodiments, CI queries 122 can use the semantic functions 120 (e.g., user-defined functions, referred to as UDFs) to measure semantic similarity between a pair of sets of tokens associated with input relational parameters. The core computational operation of a semantic function 120 (e.g., UDF) can be to calculate similarity between a pair of tokens by computing the cosine distance between the corresponding vectors (e.g., nearest neighbor computations). The cosine distance value can vary from 1.0 (e.g., very similar) to −1.0 (e.g., very dissimilar).

In one or more examples, the AI-DB 100 can support one or more various types of CI queries 122. For example and without limitation, the AI-DB 100 can support (1) similarity queries; (2) inductive reasoning queries; (3) predictive queries; or (4) cognitive OLAP queries. The one or more various types of queries can be executed over the databases with a variety of datatypes (e.g., text, numeric, or image data datatypes). Turning to similarity queries, such queries can compare two relational variables based on similarity or dissimilarity between the input variables. Additionally, in embodiments, inductive reasoning queries can exploit latent semantic information in a database to reason from part to whole, or from particular to general. One or more various types of inductive reasoning queries can be supported by the AI-DB 100. For example and without limitation, inductive reasoning queries can include analogies, semantic clustering, or odd-man-out queries.

Further, according to one or more embodiments, predictive queries can cover traditional classification or semantic queries over unseen (e.g., untrained) data. Cognitive On-Line Analytical Processing (OLAP) queries can allow SQL aggregation functions over a set identified by contextual similarity computations on relational variables. For example and without limitation, SQL aggregation functions can include MAX( ), MIN( ), or AVG( ). CI queries 122 can be implemented in one or more of a variety of ways including via SQL queries with User Defined Functions (UDFs) implemented in C/C++ or Scala, or via Python functions.

In one or more examples, relational system tables (e.g., databases) 118 can form structured data used by AI for training or inference operations. Views can be accessed which consist of rows and columns. Structured query language (SQL) database AI systems can convert the views into a textified form as input (e.g., textification) before consumed by the AI. In embodiments, queries to the AI based on the textified format (e.g., queries based on similarity, semantic and analogy) can provide insight into the database.

It is common that explainability and interpretability can be two different ways to assist understanding, assimilation, or development of domain trust in AI model results. Results of AI can be used by domain experts and therefore intuitive connections can be made between results produced by AI and domain knowledge. Typically, explainability techniques focus on explaining a result in terms of an AI model or tend to explain result(s) in terms of a black box model. Interpretability can focus on providing additional insight into result(s) using available data to a customer; and further, interpretability can be targeted to a domain expert.

Further, at least two dimensions can be identified for interpretability. For example and without limitation, interpretability can include perceptive interpretability or mathematical interpretability. Perceptive interpretability refers to details that can be humanly perceived or can be considered obvious. For example, most humans would clearly identify a picture of a cat as a cat, and the image is similar to other examples of a cat used in training. Further, presenting examples to a user is one common approach to perceptive interpretability. Additionally, mathematical interpretability can uncover statistical and mathematical structure underlying a model and data. Mathematical interpretability can also justify result(s) (e.g., the underlying structure) with respect to model features embeddings, sensitivity, or statistical distance metrics. For example, result(s) can be a presentation of common feature vectors contributing to result(s), or a data analysis of the result or training data.

In embodiments described herein, domain and data representations can be fixed as textified transactional tables. Further, the AI-DB 100 can be based on tables of rows and columns, or individual data types in the tables can consist of categorical variables in form of words. The AI-DB 100 can additionally use neural networks suitable for text processing. Perceptive interpretability and mathematical interpretability can be combined to provide additional context for results output of the AI-DB 100. A mathematical concept of co-occurrence embeddings can be used to generate examples that help with perception, and such is commonly used (e.g., as in social networks or graph AI). Further, word co-occurrence relationships can be embedded in matrix format or used in a learning process. In natural language processing (NLP), co-occurrence tends to provide more insight into a context for words in relation to other words in the text. Since textified representations of databases are used for training, similar word relationships between column entries can be computed as co-occurrence by the AI model (e.g., by the AI-DB 100). According to one or more embodiments, the interpretability approach can uncover co-occurrences related to or similar to the predicted result for a customer. The interpretability approach can further describe a co-occurrence in an intuitive manner. Further, output of interpretability can provide additional context for the results output by the AI model.

It is generally known that co-occurrence embeddings can play a role in NLP based AI as in gloVe. Co-occurrence in NLP can help build context for words in sentences. AI-DB models can incorporate co-occurrence-based embeddings to determine relationships between textified AI-DB tabular data (e.g., each row of textified AI-DB can be viewed as one or more sentences). Co-occurrence can also provide statistical intuition of context, or help a customer understand why certain candidate fields were assigned as similar by the AI model. In embodiments, given an inference query token to an AI-DB (e.g., similarity, analogy, or semantic) "Q", a model can return a set R of result tokens. For example and without limitation, a similarity query for a model of customer with certain payment methods likely to quit (e.g., customer churn) a telecom service represented by Q as Churn "Yes" can yield a set of payment methods "{Electronic_Check, Bank_Transfer_Automatic}". The AI-DB 100 can use a comparison of embeddings for Churn "Yes", with embeddings for payment method tokens.

In embodiments, co-occurrence based interpretability can demonstrate to a user overlap (e.g., an intersection) of co-occurrence heavy hitters for Q or heavy hitters for each of the element of a set R. The overlap in the heavy hitter co-occurrences can indicate to a customer the common contributors to a query and a result, or the reason the AI model selected the relationship. Unique textified strings in AI-DB 100 (e.g., SQLDB) can be referred to as tokens. For example and without limitation, the co-occurrence of a token A and a token B can be indicated as $C_{AB}$. The interpretability approach can identify the highest co-occurring tokens that contribute to the query, as well as a corpus of examples of such co-occurrences (see, e.g., FIG. 3 for interpretation algorithm 300 and token algorithm 302). The process can be repeated for the results of the similarity query {Electronic_Check, Bank_Transfer_Automatic} with the highest co-occurrence tokens identified from the database, which can provide intuition for the customer in terms of which co-occurrences that were relevant to the model in learning of the inputs and the results to AI. The outputs can be compared with key-co-occurrence features to provide additional understanding to the customer via model features or white boxed raw data.

Further, in addition to co-occurrence metrics, individual token count-based metrics can be recorded as well. Such as generally illustrated in FIG. 3, tokens with NULL values (e.g., such as those occur when data is missing) or unique tokens (e.g., such as primary keys) do not contribute to the learning and vector generation of other tokens. The count of tokens can play a significant role in embedding generation. Since the tokens are typed, columns can be identified which significantly play a role in the embedding generation model. An influence score or discriminatory score can be used to explain the importance of columns and unique tokens during training. Further, co-occurrence can be used to explain the context across the columns.

In embodiments, an influence score can capture the influence of a relational column as a measure of number of NULL values (e.g., missing data). NULL values in AI-DB 100 may not contribute to meanings of surrounding words. Thus, the influence score can be calculated as a fraction of the number of NULL values to the total number of values in a column as represented by Eq. 1 below:

$$1.0 - \text{Total}(\text{prefix}!!\text{NULL})/\text{Total}(\text{prefix}!!*) \quad \text{Eq. 1:}$$

For example and without limitation, a resulting numerical ratio from Eq. 1 can range from 1.0 to 0. A resulting numerical ratio of 1 can indicate high influence with no NULL values. Further, a resulting numerical ratio of 0 can indicate no influence or low influence (e.g., all NULL values). The influence score can therefore be used to understand influence of a sentence (e.g., a row) or an n-gram.

Further, turning now to the discriminatory score, where such score can measure the ability of a column type or an entity to distinguish or separate rows. The discriminatory score can be calculated as an aggregated score for a column type or individual unique token. Equation 2, below, represents a discriminatory score calculation for a column type:

$$\text{unique\_values\_column}/\text{total\_values\_column} \quad \text{Eq. 2:}$$

In embodiments, a discriminatory score can range between 1.0 (e.g., most discriminatory) to 1/n (e.g., least discriminatory), where n, is the total number of values in a column. Additionally, Eq. 3, below, represents a discriminatory score calculation for an individual unique token:

$$(1 - \text{token\_occurrences\_column})/\text{total\_column} \quad \text{Eq. 3:}$$

For example and without limitation, the resulting value of Equation 3 can range from (n−1)/n (e.g., most discriminating) to 0 (e.g., least discriminatory). In embodiments, the score from Equation 3 can be extended to determine discriminatory value for a sentence (e.g., row) or an n-gram.

In one or more examples, data sketches can be used for compression or compactly recording tokens in streams for pre-specified queries. Further, a variety of algorithms (e.g., Count sketches) have been developed and can be employed to query total counts of tokens seen in a stream or database. Count sketches can be implemented as two-dimensional tables, and each row indexed by a different hash function. During query, a count summarization can be performed across the rows using a pre-specified algorithm (e.g., such as a minimum function).

Further, FIG. 2 illustrates a block diagram of an example, non-limiting semantic SQL interpretation system 200 that can employ sparse hash-table based sketches to interpret semantic SQL query results. Repetitive description of like elements employed in other embodiments described herein is omitted for sake of brevity. Aspects of systems (e.g., the semantic SQL interpretation system 200 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, or the like) can cause machines to perform operations described.

With embodiments in accordance with FIG. 2, the semantic SQL interpretation system 200 can comprise a receiving component 202 or a computing component 204. The receiving component 202 can receive results of a semantic SQL query. The computing component 204 can employ sparse hash-table based sketches to interpret the semantic SQL query result(s). The receiving component 202 or the computing component 204 can be associated with a cloud computing environment 1200. For example and without limitation, the system 200 can further comprise a storage component 206. The storage component 206 can store a first space-efficient data structure sketch 200A in a compressed serialized form. Additionally, the computing component 204 can load a second space-efficient data sketch 200B along with the first space-efficient data structure sketch 200A or the computing component can compute interpretability scores by extracting co-occurrence information from the first space-efficient data structure sketch 200A.

In embodiments, the semantic SQL interpretation system 200 can comprise a reducing component 208 that uses compressed sparse matrix representations to reduce memory size of first space-efficient data structure sketch 200A or second space-efficient data structure sketch 200B. Further, semantic SQL interpretation system 200 can also include an extraction component 210 that extracts co-occurrence information from an input source (e.g., input sources/devices 232 or database 226) and updates the first space-efficient data structure sketch 200A or the second space-efficient data structure sketch 200B. Additionally, the semantic SQL interpretation system 200 can comprise a generating component 212 that can generate the first space-efficient data structure sketch 200A or the second space-efficient data structure sketch 200B from a training document (e.g., an input source/devices 232).

For example and without limitation, the receiving component 202, the computing component 204, or the storage component 206 can be connected with one or more machines comprised by the semantic SQL interpretation system 200. As used herein, one or more machines can include one or more of a computing device, a general-purpose computer, a special-purpose computer, a quantum computing device (e.g., a quantum computer), a tablet computing device, a handheld device, a server class computing machine or database, a laptop computer, a notebook computer, a desktop computer, a cell phone, a smart phone, a consumer appliance or instrumentation, an industrial or commercial device, a digital assistant, a multimedia Internet enabled phone or another type of device.

In some examples, the semantic SQL interpretation system 200 can be associated with a cloud computing environment 1200 described below with reference to FIG. 12 or with one or more functional abstraction layers described below with reference to FIG. 13 (e.g., hardware and software layer 1360, virtualization layer 1370, management layer 1380 or workloads layer 1390).

The semantic SQL interpretation system 200 or components thereof (e.g., the receiving component 202, the computing component 204, or the storage component 206) can employ one or more computing resources of the cloud computing environment 1200 described below with reference to FIG. 12, or with reference to the one or more functional abstraction layers (e.g., quantum software or the like) described below with reference to FIG. 13, to execute one or more operations in accordance with one or more embodiments described herein. For example, cloud computing environment or one or more of the functional abstraction layers 1360, 1370, 1380, or 1390 can comprise one or more classical computing devices (e.g., classical computer, classical processor, virtual machine, server or the like), quantum hardware or quantum software (e.g., quantum computing device, quantum computer, quantum processor, quantum circuit simulation software, superconducting circuit or the like) that can be employed by the system or components thereof to execute one or more operations in accordance with one or more embodiments described herein. For instance, the system or components thereof can employ one or more classical or quantum computing resources to execute one or more classical or quantum: mathematical functions, calculations or equations; computing or processing scripts; algorithms; models (e.g., artificial intelligence (AI) models, machine learning (ML) models or like model); or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks or other fundamental computing resources where the consumer can deploy and run arbitrary software, which can include operating systems and applications. The consumer does not manage or control the underlying cloud infrastructure but has control over operating systems, storage, deployed applications or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity or semantic interoperability. At the heart of cloud computing is an infrastructure that includes a network of interconnected nodes.

Moreover, the semantic SQL interpretation system 200 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the semantic SQL interpretation system 200 can be employed to use hardware or software to solve problems that are highly technical in nature, that are not abstract or that cannot be performed as a set of mental acts by a human.

Turning now to aspects of the semantic SQL interpretation system 200, the system 200 can comprise one or more receiving component 202, one or more computing component 204, one or more storage component 206, one or more reducing component 208, one or more extraction component 210, one or more system bus 220, one or more memory/storage component 222, one or more processor 224, one or more networks 230, one or more input sources/devices 232, one or more computer applications 234, or one or more databases 226 (e.g., which can be AI-DB s).

It should be appreciated that the embodiments depicted in various figures disclosed herein are for illustration only, and as such, the architecture of embodiments is not limited to the systems, devices or components depicted therein, nor to any particular order, connection or coupling of systems, devices or components depicted therein. For example, in some embodiments, the semantic SQL interpretation system 200 can further comprise various computer or computing-based elements described herein with reference to operating environment 1100 and FIG. 11. In several embodiments, computer or computing-based elements can be used in connection with implementing one or more of the systems, devices, components or computer-implemented operations shown and described in connection with FIG. 2 or with other figures disclosed herein.

Memory 222 can store one or more computer or machine readable, writable or executable components or instructions that, when executed by processor 224 (e.g., a classical processor, a quantum processor or like processor), can facilitate performance of operations defined by the executable component(s) or instruction(s). For example, memory 222 can store computer or machine readable, writable or executable components or instructions that, when executed by processor 224, can facilitate execution of the various functions described herein relating to the receiving component 202, the computing component 204, the storage component 206, the reducing component 208, the extraction component 210, the generating component 212, or another component associated with the semantic SQL interpretation system 200 as described herein with or without reference to the various figures of the one or more embodiments.

Memory 222 can comprise volatile memory (e.g., random access memory (RAM), static RAM (SRAM), dynamic RAM (DRAM) or the like) or non-volatile memory (e.g., read only memory (ROM), programmable ROM (PROM), electrically programmable ROM (EPROM), electrically erasable programmable ROM (EEPROM) or the like) that can employ one or more memory architectures. Further examples of memory 222 are described below with reference to system memory 1106 and FIG. 11. These examples of memory 222 can be employed to implement any one or more embodiments described herein.

Processor 224 can comprise one or more types of processors or electronic circuitry (e.g., a classical processor, a quantum processor or like processor) that can implement one or more computer or machine readable, writable or executable components or instructions that can be stored at memory 222. For example, processor 224 can perform various operations that can be specified by computer or machine readable, writable or executable components or instructions including, but not limited to, logic, control, input/output (I/O), arithmetic or the like. In some embodiments, processor 224 can comprise one or more central processing unit, multi-core processor, microprocessor, dual microprocessors, microcontroller, System on a Chip (SOC), array processor, vector processor, quantum processor or another type of processor. Additional examples of processor 224 are described below with reference to processing unit 1104 and FIG. 11. The examples of processor 224 can be employed to implement any one or more embodiments described herein.

The semantic SQL interpretation system 200, the receiving component 202, the computing component 204, the storage component 206, the reducing component 208, the extraction component 210, the generating component 212, the processor 224, or another component of system 200 the memory 222 as described herein can be communicatively, electrically, operatively or optically coupled to one another via a bus 220 to perform functions of system 200 or any components coupled therewith. Bus 220 can comprise one or more memory bus, memory controller, peripheral bus, external bus, local bus, a quantum bus or another type of bus that can employ various bus architectures. Further examples of bus 220 are described below with reference to system bus 1308 and FIG. 13. The examples of bus 220 can be employed to implement any one or more embodiments described herein.

The semantic SQL interpretation system 200 can comprise any type of component, machine, device, facility, apparatus or instrument that comprises a processor or can be capable of effective or operative communication with a wired or wireless network. All such embodiments are envisioned. For example, the semantic SQL interpretation system 200 can comprise a server device, a computing device, a general-purpose computer, a special-purpose computer, a quantum computing device (e.g., a quantum computer), a tablet computing device, a handheld device, a server class computing machine or database, a laptop computer, a notebook computer, a desktop computer, a cell phone, a smart phone, a consumer appliance or instrumentation, an industrial or commercial device, a digital assistant, a multimedia Internet enabled phone, a multimedia players or another type of device.

The semantic SQL interpretation system 200 can be coupled (e.g., communicatively, electrically, operatively, optically or the like) to one or more external systems, sources or devices (e.g., classical or quantum computing devices, communication devices or the like) via a data cable (e.g., High-Definition Multimedia Interface (HDMI), recommended standard (RS) 232, Ethernet cable or the like). In some embodiments, the semantic SQL interpretation system 200 can be coupled (e.g., communicatively, electrically, operatively, optically or the like) to one or more external systems, sources or devices (e.g., classical or quantum computing devices, communication devices or the like) via a network.

In some embodiments, a network can comprise one or more wired or wireless networks, including, but not limited to, a cellular network, a wide area network (WAN) (e.g., the Internet), or a local area network (LAN). For example, the semantic SQL interpretation system 200, the receiving component 202, the computing component 204, the storage component 206, the reducing component 208, the extraction component 210, or the generating component 212 can communicate with one or more external systems, sources or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other wireless technologies or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol or other proprietary or non-proprietary communication protocols. In a related example, the semantic SQL interpretation system 200 can include hardware (e.g., a central processing unit (CPU), a transceiver, a decoder, quantum hardware, a quantum processor or the like), software (e.g., a set of threads, a set of processes, software in execution, quantum pulse schedule, quantum circuit, quantum gates or the like) or a combination of hardware and software that facilitates communicating information among the semantic SQL interpretation system 200 and external systems, sources or devices (e.g., computing devices, communication devices or the like).

The semantic SQL interpretation system 200 can comprise one or more computer or machine readable, writable or executable components or instructions that, when executed by processor 224 (e.g., a classical processor, a quantum processor or the like), can facilitate performance of one or more operations defined by such component(s) or instruction(s). Further, in numerous embodiments, any component associated with the semantic SQL interpretation system 200, as described herein with or without reference to the various figures of the one or more embodiments, can comprise one or more computer or machine readable, writable or executable components or instructions that, when executed by processor 224, can facilitate performance of one or more operations defined by such component(s) or instruction(s). For example, the receiving component 202, the computing component 204, the storage component 206, the reducing component 208, the extraction component 210, the generating component 212, or any other components associated with the semantic SQL interpretation system 200 as disclosed herein (e.g., communicatively, electronically, operatively or optically coupled with or employed by system 200), can comprise such computer or machine readable, writable or executable component(s) or instruction(s). Consequently, according to numerous embodiments, the semantic SQL interpretation system 200 or any components associated therewith as disclosed herein, can employ processor 224 to execute such computer or machine readable, writable or executable component(s) or instruction(s) to facilitate performance of one or more operations described herein with reference to system 200 or any such components associated therewith.

The semantic SQL interpretation system 200 can facilitate (e.g., via processor 224) performance of operations executed by or associated with the receiving component 202, the computing component 204, the storage component 206, the reducing component 208, the extraction component 210, the generating component 212, or another component associated with system 200 as disclosed herein. For instance, as described in detail below, the semantic SQL interpretation system 200 can facilitate via processor 224 (e.g., a classical processor, a quantum processor or the like): receiving, using a processor 224 operatively coupled to memory 222, results of a semantic SQL query; employing, using the processor 224, sparse hash-table based sketches to interpret the semantic SQL query result; loading, using the processor 224, a first space-efficient data structure sketch 200A and a second space-efficient data structure sketch 200B from a training document; storing, using the processor 224, the first space-efficient data structure sketch 200A and a second space-efficient data structure sketch 200B in compressed serialized form; or computing, using the processor 224, one or more interpretability scores via extracting co-occurrence information from the first space-efficient data structure sketch 200A and extracting Boolean containment information from the second space-efficient data structure sketch 200B.

Figure 4B:
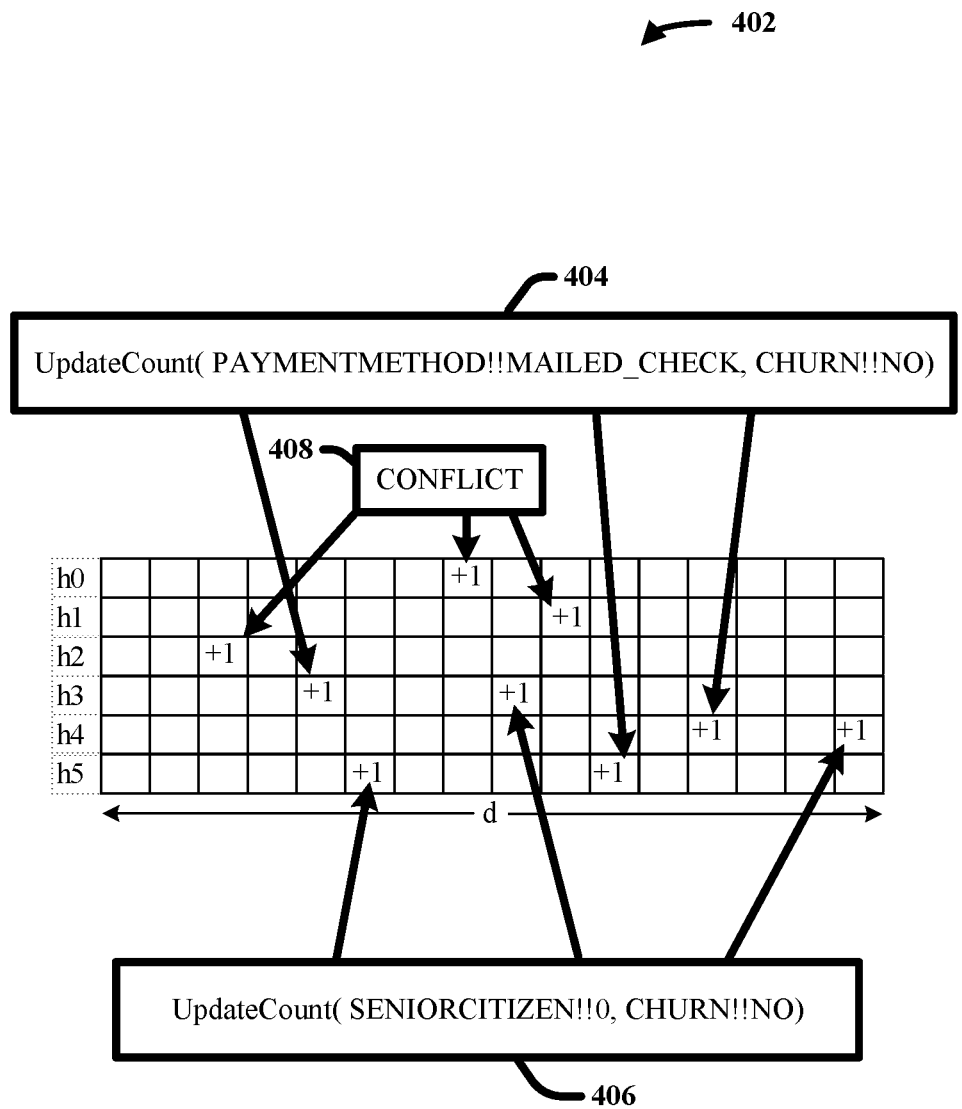
FIG. 4B illustrates a diagram of an updated first space-efficient data structure sketch, in accordance with one or more embodiments described herein.

Turning now to additional aspects illustrated at FIGS. 4A and 4B, one or more Count sketches can be updated with token pair occurrences in a textified database and used for cognitive AI. Co-occurrence counts between column tokens of the AI-DB textified data strings can be tracked and incremented in a first space-efficient data structure sketch (e.g., a count sketch) 200A. The update process/algorithm 400 and corresponding table 402 are shown in FIGS. 4A and 4B. Further, FIGS. 4A and 4B demonstrate a value of two tuples being updated. For example and without limitation, the tuples are indicated in FIGS. 4A and 4B as PAYMENT-METHOD!!MAILED_CHECK (404) and SENIORCITIZEN!!0 (406), where, $h_0$-$h_5$ can be one or more of a variety of hash functions and d can a range of the hash functions. For each tuple, there is a location for a particular hash function; therefore, the count can be updated for an occurrence. If two tuples map to the same location, two instances of incrementing can occur (one for each tuple) creating a conflict 408. More than one tuple can map to the same location within the first space-efficient data structure sketch 200A causing one or more conflicts 408 as shown in FIG. 4B. The minimum can be taken from the values of the locations of the hash functions (e.g., $h_0$-$h_5$) as a best approximation for the actual co-occurrence of the tuples to limit the effect of the conflicts 408.

In embodiments, such as generally illustrated in FIG. 5A, 5B, 5C, or 5D, the semantic SQL interpretation system 200 can use sparse matrices to represent large sketches/datasets. Sparse sketches/matrices can provide accuracy in interpretability or allow for space or performance afforded by sparse matrix techniques (e.g., increasing the size of the sketch while allowing sparsity). Counts of entries in columns can be tracked as well as their co-occurrences for interpretability purposes. The number of co-occurring tokens can be high (e.g., such as shown in Table 1000 of FIG. 10). Sketches can provide compact and compressed (slightly approximate) structures to record counts of co-occurring tokens.

Turning now to aspects as illustrated in FIG. 5A, rows in the first space-efficient data structure sketch 200A can be made reasonable wide or deep, or can include a Count-min algorithm. The Count-min algorithm can minimize the impact of hash conflicts 408 across the co-occurring tokens (e.g., see FIG. 4B for conflicts 408). The first space-efficient data structure sketch 200A can be represented in one or more various data forms. FIG. 5A shows the first space-efficient data structure sketch 200A in four stages (502, 504, 506, 508) for analysis and processing ease. An initial reduction of the first space-efficient data structure sketch 200A can be represented at 502. Moving to FIG. 5B, the first space-efficient data structure sketch 200A can be further reduced as a two-dimensional array represented or operated efficiently as a compact array using sparse matrix representation techniques (such as generally shown in FIG. 5B). Such techniques can enable the representation of counts for a large number of co-occurrences in a sparce memory-efficient manner (e.g., by removing low occurring items). Each column in the first space-efficient data structure sketch 200A at 502 can include multiple possible values. For example, in embodiments, such as Customer Churn, the column can have binary values (e.g., I/O, Yes/No). In other cases, such as Year, the column can span tens or hundreds of possible entries. In other embodiments and other examples, a column A can include m unique possible values and a column B can include n unique possible values. Thus, a total number of co-occurring tokens the system can keep track of can be expressed as (m*n). Further, for k possible columns, the total number of co-occurrences can be expressed as high as (m*n*k).

In embodiments, such as generally illustrated in FIG. 5B, the semantic SQL interpretation system 200 can represent the first space-efficient data structure sketch 200A as a sparse matrix 504. Co-occurrence values are indicated by letters (e.g., x, w, b, etc.) within the sparse matrix 504 (e.g., with the removal of low occurring items). Further, the sparse matrix 504 can be compressed into a value array 506A and corresponding index array 506B (via about a 6-10× compression reduction). The compressed column storage for sparse matrix 504 (506A and 506B) can further be represented by a relational table 508 (e.g., or in vector format), as shown in FIG. 5D. The relational table 508 can be queried in a compressed format for runtime interpretability of the first space-efficient data structure sketch 200A. For example, the relational table 508 can be queried at a faster/improved rate than the sparse matrix 504. Further, the semantic SQL interpretation system 200 can compute interpretability scores via extracting counts from the loaded relational table 508. FIGS. 5A, 5B, 5C, and 5D generally illustrate transforming/reducing/compressing the first space-efficient data structure sketch 200A in a variety of stages.

Figure 6A:
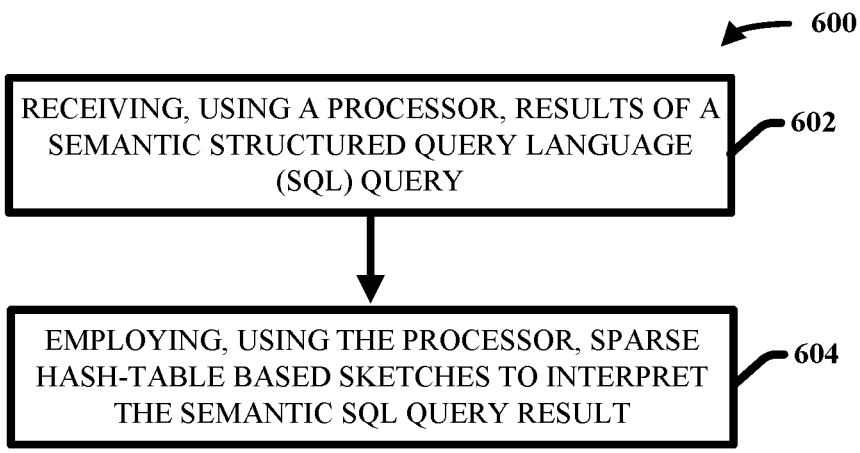
FIG. 6A illustrates a flow diagram of an example, non-limiting computer implemented method that facilitates employing sparse hash-table based sketches to interpret semantic SQL query results, in accordance with one or more embodiments described herein.
Figure 6B:
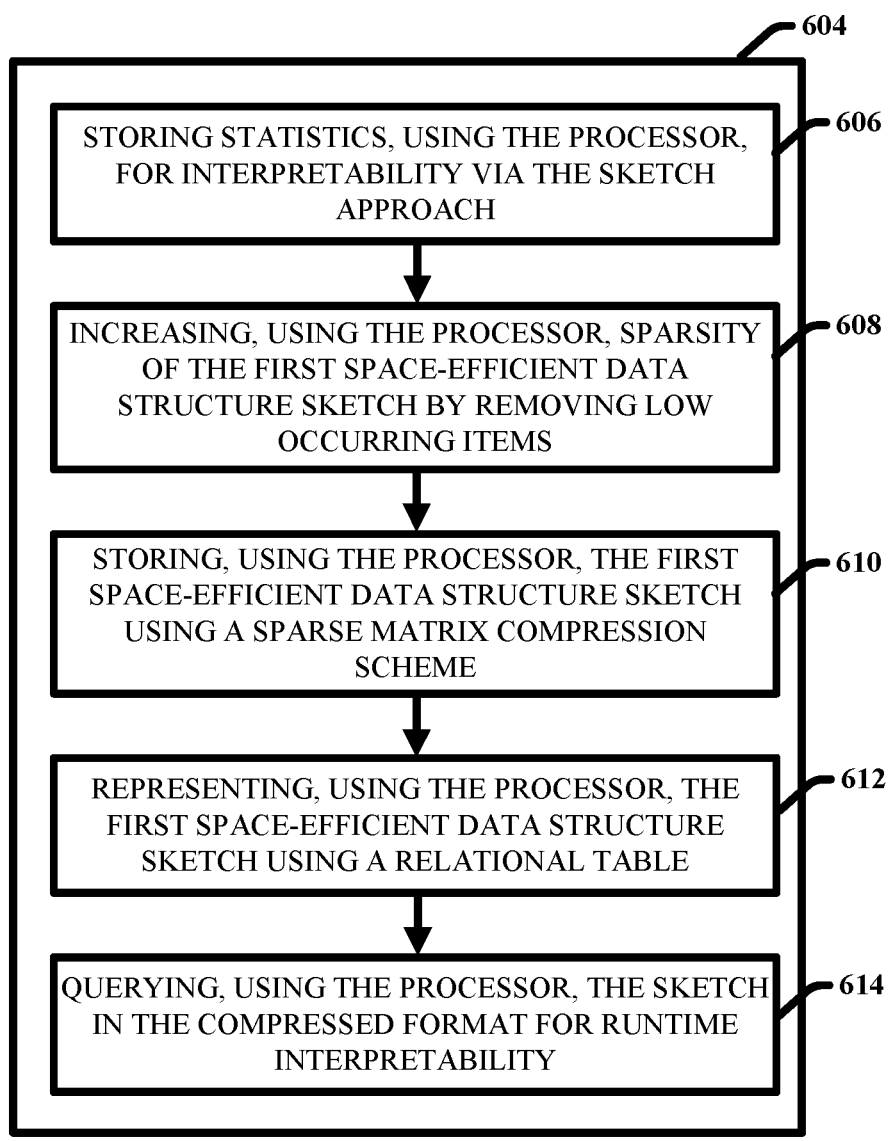
FIG. 6B illustrates a flow diagram of an example, non-limiting computer-implemented method that facilitates employing sparse hash-table based sketches to interpret semantic SQL query results, in accordance with one or more embodiments described herein.

Turning to embodiments as generally illustrated in FIGS. 6A and 6B, these figures together illustrate a flow diagram of an example, non-limiting computer implemented method 600 that can facilitate receiving, using a processor, results of a semantic SQL query (602) or employing, using the processor 224, sparse hash-table based sketches to interpret the semantic SQL query result (604). Further, in embodiments, employing step 604 can be further described in FIG. 6B, where the method can include storing statistics, using the processor 224, for interpretability via the sketch approach (606) (see, e.g., FIG. 5A).

Additionally, the non-limiting computer implemented method 600 can comprise increasing, using the processor 224, sparsity of the first space-efficient data structure sketch by removing low occurring items from the data structure (608) (see, e.g., FIG. 5B). In embodiments, Step 608 can be included in the computer implemented method 600 as an optional step. At 610, the non-limiting computer implemented method 600 can include storing, using the processor 224, the first space-efficient data structure sketch 200A using a sparse matrix compression scheme (610) (see, e.g., FIG. 5C). In embodiments, the non-limiting computer implemented method 600 can include representing, using the processor 224, the first space-efficient data structure sketch 200A using a relational table (612) (see, e.g., FIG. 5D). Further, the non-limiting computer implemented method 600 can include querying, using the processor 224, the sketch in the compressed format for runtime interpretability (614).

A common issue with sketches can be that sketches are sufficiently accurate when the number of tokens is limited, and queries are made within the limited number of tokens. If a universe of tokens used in queries is much larger than the corresponding sketch was designed for, the queries can produce inaccurate counts. Inaccurate counts can be common in database tables which have columns with a large number of possible entries (e.g., account numbers). A total k possible combinations with m and n possible values result in a large universe of (m*n) number of possible co-occurring tokens, although the actual number of co-occurrences in the database itself can be much smaller. Memory can be a limiting factor for building sketches that store counts for the large universe of all possible token co-occurrences. The following figures and description address a solution to memory or computational limitations.

Figure 7A:
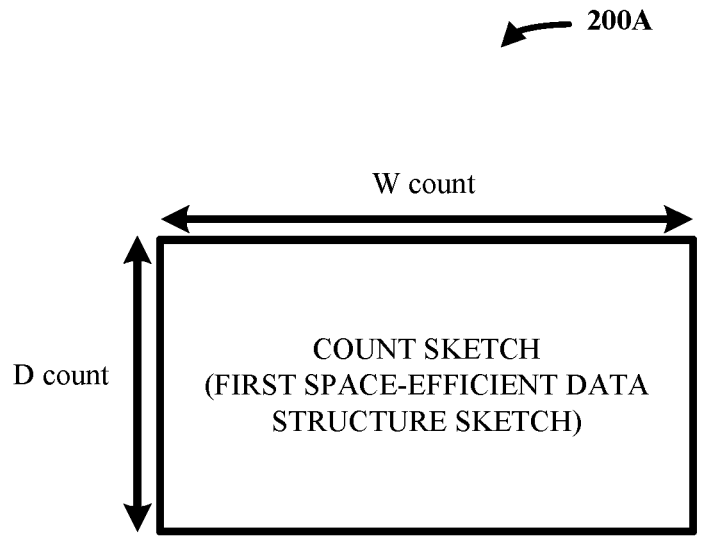
FIG. 7A illustrates a block diagram of a first space-efficient data structure sketch, in accordance with one or more embodiments described herein.
Figure 7B:
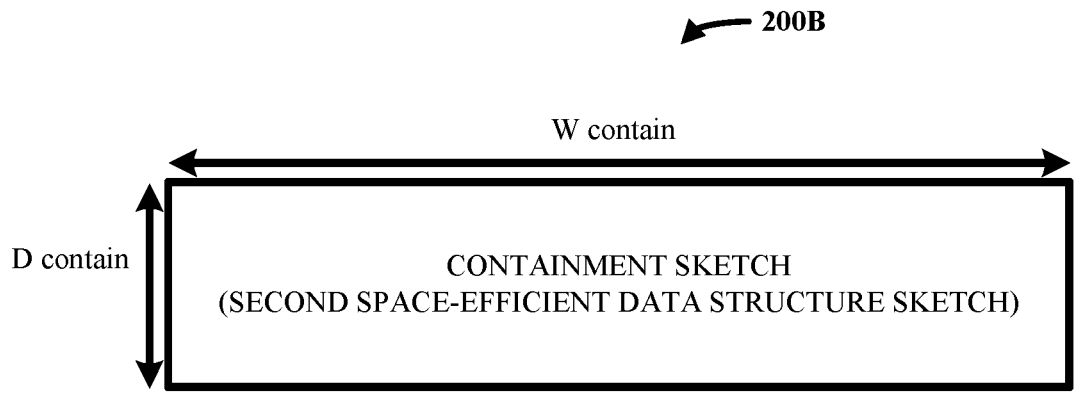
FIG. 7B illustrates a block diagram of a second space-efficient data structure sketch, in accordance with one or more embodiments described herein.

Turning now to aspects illustrated in FIGS. 7A and 7B, the semantic SQL interpretation system 200 can query the count sketch (e.g., the first space-efficient data structure sketch 200A) for tokens that exist in the database by using a second space-efficient data structure sketch 200B (e.g., a shadow sketch or a Boolean sketch). The second space-efficient data structure sketch 200B can track which co-occurrences actually exist in the database as opposed to all possible permutations of co-occurrences that could occur. Further, the entries in the hashed rows (e.g., "D contain") can include binary values; whereby, the second space-efficient data structure sketch 200B can record whether a token exists or does not exist within the first space-efficient data structure sketch 200A (e.g., the count sketch), via a single bit. Accuracy can be improved via deep sketches with rows each having different hashes. During a query, each of the rows can be updated based on the hash function for that row. Further, during a query, all rows can be queried and a Boolean AND can be performed across the rows.

For example and without limitation, the non-limiting computer implemented method 600 can comprise loading, using the processor 224, a first space efficient data structure sketch 200A or loading a second space efficient data structure sketch 200B from a training document (e.g., can be connected with an input source/device 232). The non-limiting computer implemented method 600 can further comprise storing, using the processor 224, the first space-efficient data structure sketch 200A or the second space-efficient data structure sketch 200B in compressed serialized form. Additionally, the non-limiting computer implemented method 600 can comprise computing, using the processor 224, one or more interpretability scores via extracting co-occurrence information from the first space-efficient data structure sketch 200A and extracting Boolean containment information from the second space-efficient data structure sketch 200B (e.g., which, in embodiments for example, can be a bloom sketch). The non-limiting computer implemented method 600 can further comprise querying, using the processor 224, the second space-efficient data structure sketch 200B for a bi-gram tuple; or querying, using the processor 224, the first space-efficient data structure sketch 200A for co-occurrence values of the bi-gram tuple in response to a true Boolean value from the query of the second space-efficient data structure sketch 200B.

Figure 8A:
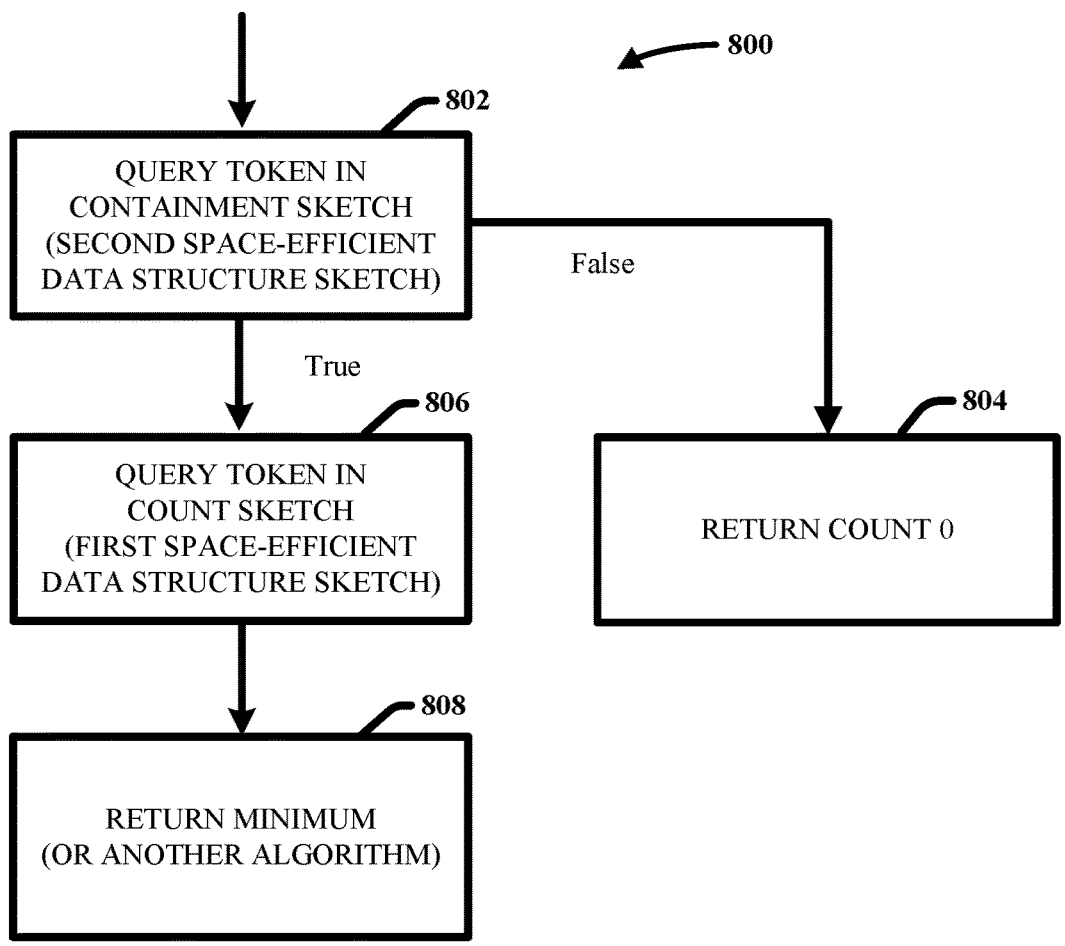
FIGS. 8A and 8B illustrate flow diagrams of an example, non-limiting computer implemented method that facilitates employing sparse hash-table based sketches to interpret semantic SQL query results, in accordance with one or more embodiments described herein.
Figure 8B:
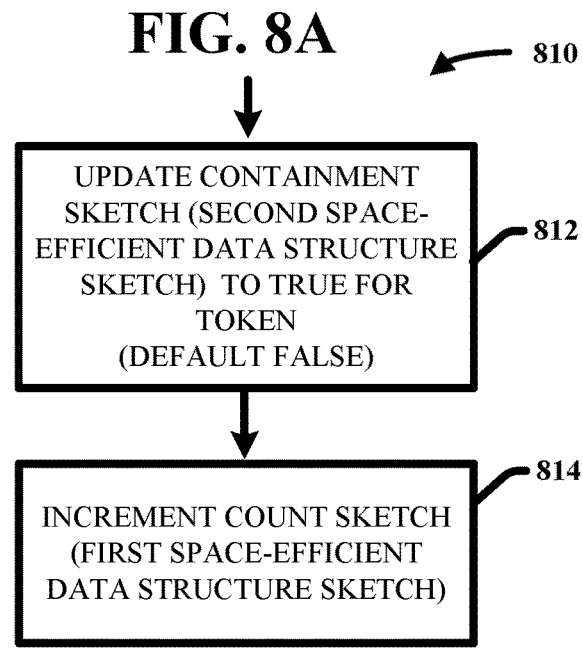

With embodiments, such as generally shown in FIGS. 8A and 8B, the non-limiting computer implemented method 600 can include containment check method 800 executed as a portion of step 604. The containment check method 800 can include querying a token (e.g., a bi-gram tuple) in the second space-efficient data structure sketch 200B (802). In response to a return count of zero (804) in the second space-efficient data structure sketch 200B (e.g., the Boolean sketch), the query is concluded by the system 200. Additionally or alternatively, in response to a positive query result (806), actual counts for the token can be checked in the first space-efficient data structure sketch 200A (808).

Further, such as illustrated by FIG. 8B, in response to a positive query result, the non-limiting computer implemented method 600 can include an update method 810 executed as a portion of step 604. The update method 810 can include updating the second space-efficient data structure sketch 200B to true for the queried token (812). Further, the update method 810 can include incrementing the first space-efficient data structure sketch 200A in response to updating the second space-efficient data structure sketch 200B (814).

In embodiments, the compression of the first space-efficient data structure sketch 200A or the second space-efficient data structure sketch 200B can be improved by thresholding small values and setting such values to zero (causing the matrix to be sparser). During interpretability, large counts remain unaltered or smaller counts are removed or annotated (e.g., to show discriminatory scores). When interpretability queries can be structured in a manner that only high frequency counts are presented in sorted order, then low frequency counts become less important. In some embodiments, low frequency counts can be removed altogether without a significant impact on the accuracy of an interpretability query. Low frequency can be determined in terms of the median values of the frequencies of the co-occurring tokens. The median values among all co-occurring pairs can be computed and a threshold can be selected in response.

In other embodiments, a sketch creation algorithm of the semantic SQL interpretation system 200 tracks the co-occurrence in every row, and therefore the runtime of the system 200 grows linearly with the size of the input (e.g., text file). Sketches are inherently distributive in nature. The first space-efficient data structure sketch 200A or the second space-efficient data structure sketch 200B can be simply added together without loss of accuracy if the sizes and the hash functions are the same (e.g., meaning the first sketch and the second sketch are compatible). Increased processing can be achieved via multiprocessing as indicated in FIG. 9 in MultiprocessCreateSketch algorithm 900. One or more text files can be split by rows into one or more non-overlapping segments, and separate count sketches can be generated for each segment in parallel by separate threads. Once the sketch generation for the segment is complete, the sketches generated by each thread can be merged together by adding entries in the sketches into a single top-level sketch.

For example and without limitation, the number of unique token pairs can be high depending on the number of unique values that each column can have. The large number of unique token pairs can preclude the use of a dictionary of "string, count" pairs prohibitive, since the key strings can consume significant space. The use of sparse sketches can remove the need to maintain strings altogether by hashing the query string to a unique probabilistic locations. Conflicts/errors due to the probabilistic nature of the hash functions can be reduced by the use of several hashed rows in a count-min configuration. As shown in FIG. 10, Table 1002 includes count sketch statistics. The area of the sketch (e.g., depth*width) can be kept constant mainly due to limitations of available memory in the experimental systems. On machines with larger memory available, the sparsity for datasets such as AML and CA Toxicity would be much higher similar to those of the other datasets. Further, Table 1004 includes thresholding sparsity improvement data by enabling low frequency counts to be set to zero to produce minimal errors in interpretability results. An optimal size of the sketch can depend on the number of columns in the database, or the number of unique token entries for each column which determines the total number of co-occurrence tokens to be recorded.

Additionally, as shown in FIG. 10, improvements in runtime for larger datasets can be illustrated by Table 1006. In smaller datasets, the overhead of dataset partitioning, thread startup, sketch binary file write followed by merge does not provide an overall benefit to runtime. Conversely, there is significant improvement in runtime for larger data sets. Multiprocessing can be implemented to manage increasing datasets.

Figure 11:
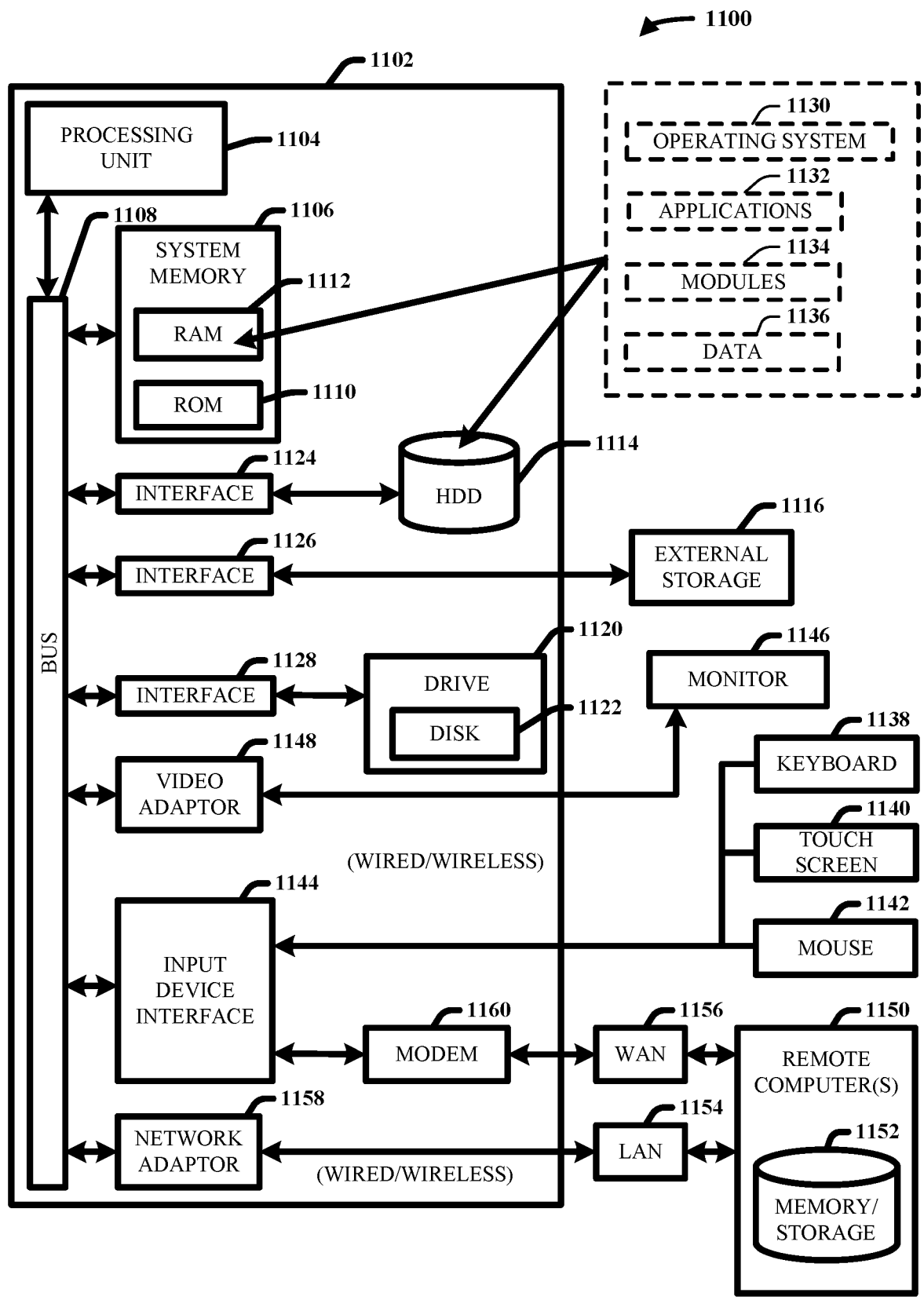
FIG. 11 illustrates a block diagram of an example, non-limiting operating environment in which one or more embodiments described herein can be facilitated.

In order to provide additional context for one or more embodiments described herein, FIG. 11 and the following discussion are intended to provide a brief, general description of a suitable operating environment 1100 in which the one or more embodiments described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures or the like that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

One or more of the illustrated embodiments described herein also can be practiced in a distributed computing environment where certain tasks are performed by remote processing devices that are linked through a communications network. In a distributed computing environment, program modules can be located both in local and remote memory storage devices.

Computing devices typically include a variety of media, which can include computer-readable storage media, machine-readable storage media or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection or wireless media such as acoustic, RF, infrared or other wireless media.

With reference again to FIG. 11, the example operating environment 1100 for implementing one or more embodiments of the aspects described herein includes a computer 1102, the computer 1102 including a processing unit 1104, a system memory 1106 or a system bus 1108. The system bus 1108 can couple system components including, but not limited to, the system memory 1106 to the processing unit 1104. The processing unit 1104 can be any of various commercially available processors. Dual microprocessors or other multi-processor architectures can be employed as the processing unit 1104.

The system bus 1108 can be any of several types of bus structure that can further interconnect to a memory bus (with or without a memory controller), a peripheral bus or a local bus using any of a variety of commercially available bus architectures. The system memory 1106 can include ROM 1110 or RAM 1112. A basic input/output system (BIOS) can be stored in a non-volatile memory such as ROM, erasable programmable read only memory (EPROM) or EEPROM, which BIOS contains the basic routines that help to transfer information among elements within the computer 1102, such as during startup. The RAM 1112 can also include a high-speed RAM, such as static RAM for caching data.

The computer 1102 further can include an internal hard disk drive (HDD) 1114 (e.g., EIDE, SATA), one or more external storage devices 1116 (e.g., a magnetic floppy disk drive (FDD), a memory stick or flash drive reader, a memory card reader or the like) or a drive 1120, e.g., such as a solid state drive or an optical disk drive, which can read or write from a disk 1122, such as a CD-ROM disc, a DVD, a BD or the like. Additionally or alternatively, where a solid state drive is involved, disk 1122 could not be included, unless separate. While the internal HDD 1114 is illustrated as located within the computer 1102, the internal HDD 1114 can also be configured for external use in a suitable chassis (not shown). Additionally, while not shown in operating environment 1100, a solid state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The HDD interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more applications 1132, other program modules 1134 or program data 1136. All or portions of the operating system, applications, modules or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In a related embodiment, operating system 1130 can comprise one virtual machine (VM) of multiple VMs hosted at computer 1102. Furthermore, operating system 1130 can provide runtime environments, such as the JAVA runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries or settings for an application.

Further, computer 1102 can be enabled with a security module, such as a trusted processing module (TPM). For instance, with a TPM, boot components hash next in time boot components and wait for a match of results to secured values before loading a next boot component. This process can take place at any layer in the code execution stack of computer 1102, e.g., applied at application execution level or at operating system (OS) kernel level, thereby enabling security at any level of code execution.

A user entity can enter commands and information into the computer 1102 through one or more wired/wireless input devices, e.g., a keyboard 1138, a touch screen 1140 or a pointing device, such as a mouse 1142. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface or the like.

A monitor 1146 or other type of display device can be also connected to the system bus 1108 via an interface, such as a video adapter 1148. In addition to the monitor 1146, a computer typically includes other peripheral output devices (not shown), such as speakers, printers or the like.

The computer 1102 can operate in a networked environment using logical connections via wired or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 or larger networks, e.g., a wide area network (WAN) 1156. LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link among the computers can be used.

When used in either a LAN or WAN networking environment, the computer 1102 can access cloud storage systems or other network-based storage systems in addition to, or in place of, external storage devices 1116 as described above, such as but not limited to, a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1151 or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop or portable computer, portable data assistant, communications satellite, telephone or any piece of equipment or location associated with a wirelessly detectable tag (e.g., a kiosk, news stand, store shelf or the like). This can include Wireless Fidelity (Wi-Fi) and BLUETOOTH® wireless technologies. Thus, the communication can be a predefined structure as with a conventional network or simply an ad hoc communication between at least two devices.

Figure 12:
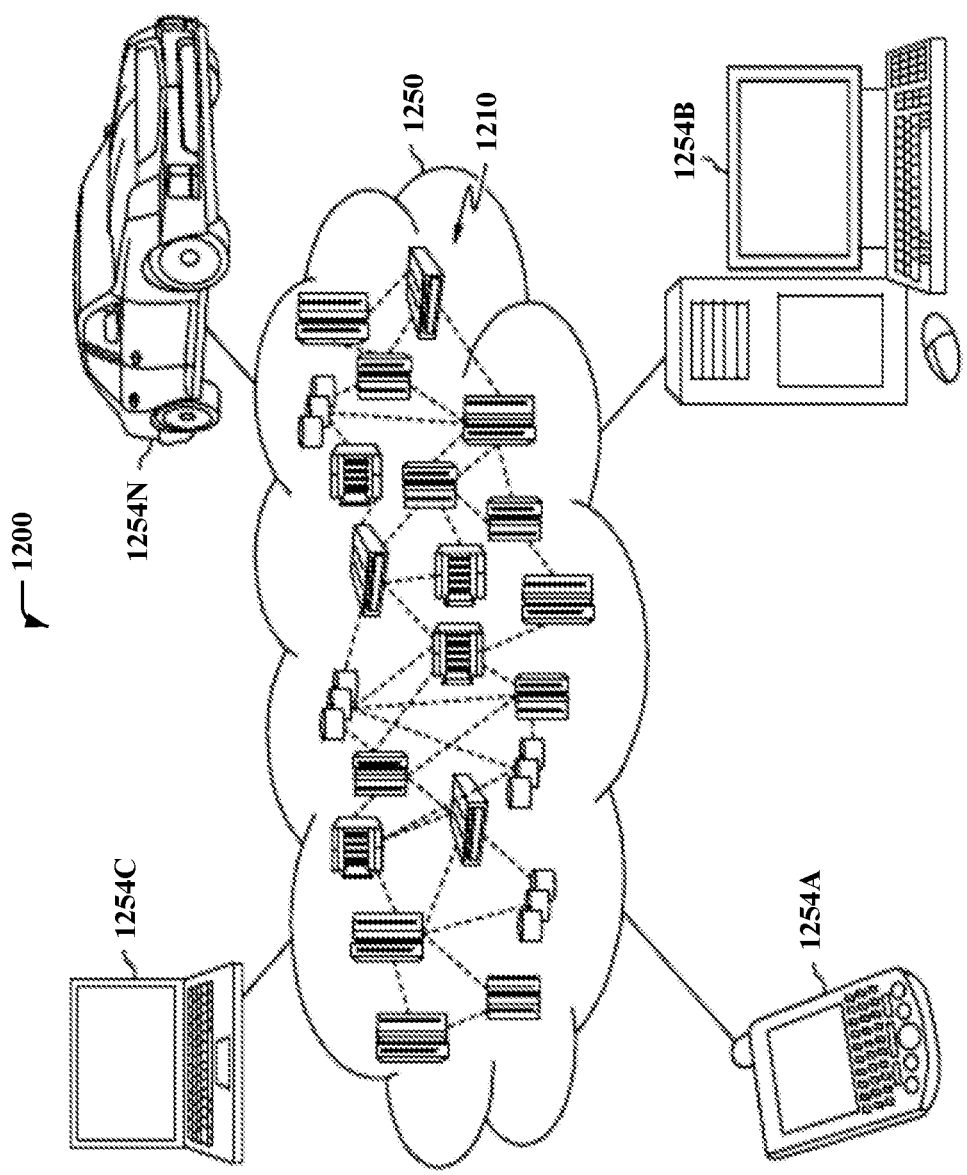
FIG. 12 illustrates a block diagram of an example, non-limiting cloud computing environment in accordance with one or more embodiments described herein.

Referring now to FIG. 12, an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C or automobile computer system 1254N can communicate. Although not illustrated in FIG. 12, cloud computing nodes 1210 can further comprise a quantum platform (e.g., quantum computer, quantum hardware, quantum software or the like) with which local computing devices used by cloud consumers can communicate. Cloud computing nodes 1210 can communicate with one another. They can be grouped (not shown) physically or virtually, in one or more networks, such as Private, Community, Public, or Hybrid clouds as described hereinabove, or a combination thereof. This allows cloud computing environment 1250 to offer infrastructure, platforms or software as services for which a cloud consumer does not need to maintain resources on a local computing device. It is understood that the types of computing devices 1254A-N shown in FIG. 12 are intended to be illustrative only and that cloud computing nodes 1210 and cloud computing environment 1250 can communicate with any type of computerized device over any type of network or network addressable connection (e.g., using a web browser).

Figure 13:
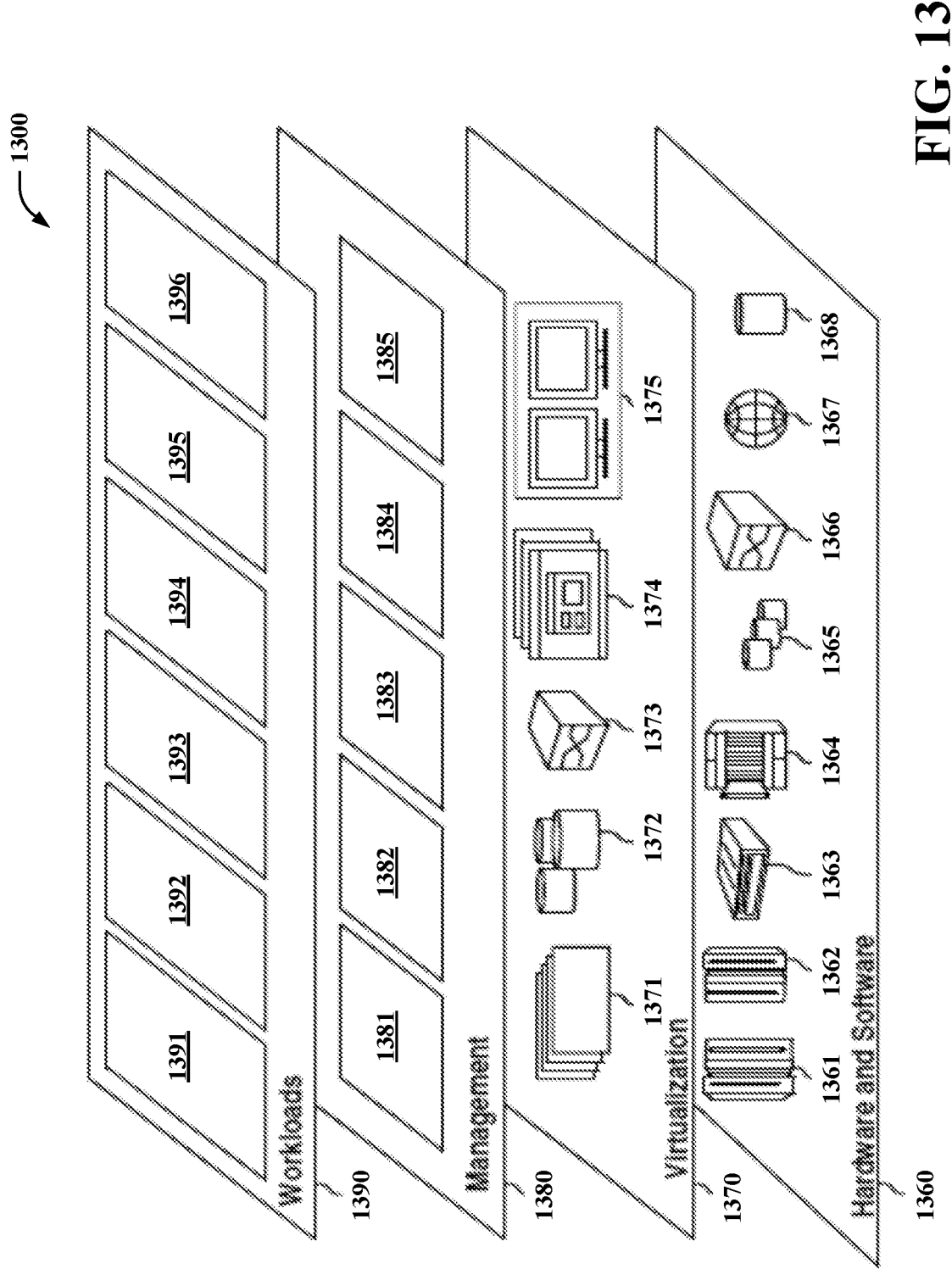
FIG. 13 illustrates a block diagram of a plurality of example, non-limiting abstraction model layers, in accordance with one or more embodiments described herein.

Referring now to FIG. 13, a set of functional abstraction layers is shown, such as provided by cloud computing environment 1250 (FIG. 12). It should be understood in advance that the components, layers and functions shown in FIG. 13 are intended to be illustrative only and embodiments described herein are not limited thereto. As depicted, the following layers and corresponding functions are provided:

Hardware and software layer 1360 can include hardware and software components. Examples of hardware components include: mainframes 1361; RISC (Reduced Instruction Set Computer) architecture-based servers 1362; servers 1363; blade servers 1364; storage devices 1365; and networks and networking components 1366. In one or more embodiments, software components can include network application server software 1367, quantum platform routing software 1368 or quantum software (not illustrated in FIG. 13).

Virtualization layer 1370 can provide an abstraction layer from which the following examples of virtual entities can be provided: virtual servers 1371; virtual storage 1372; virtual networks 1373, including virtual private networks; virtual applications or operating systems 1374; or virtual clients 1375.

In one example, management layer 1380 can provide the functions described below. Resource provisioning 1381 can provide dynamic procurement of computing resources and other resources that can be utilized to perform tasks within the cloud computing environment. Metering and Pricing 1382 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or constituent) portal 1383 can provide access to the cloud computing environment for consumers and system administrators. Service level management 1384 can provide cloud computing resource allocation and management such that required service levels are met. Service Level Agreement (SLA) planning and fulfillment 1385 can provide pre-arrangement for, and procurement of, cloud computing resources for which a future requirement is anticipated in accordance with an SLA.

Workloads layer 1390 can provide examples of functionality for which the cloud computing environment can be utilized. Non-limiting examples of workloads and functions which can be provided from this layer include: mapping and navigation 1391; software development and lifecycle management 1392; virtual classroom education delivery 1393; data analytics processing 1394; transaction processing 1395; or application transformation software 1396.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages.

The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes the computer executable components stored in the memory, wherein the computer executable components comprise:
a storage component that stores a first space-efficient data structure sketch in a compressed serialized form;
a receiving component that receives results of a semantic structured query language (SQL) query; and
a computing component that employs sparse hash-table based sketches to interpret the semantic SQL query result, wherein the computing component loads a second space-efficient data structure sketch along with the first space-efficient data structure sketch and computes one or more interpretability scores by extracting co-occurrence information from the first space-efficient data structure sketch.

2. The system of claim 1, wherein the second space-efficient data structure sketch includes a sketch for containment check.

3. The system of claim 2, wherein the one or more interpretability scores are determined by co-occurrence counts from the first space-efficient data structure sketch and Boolean containment values from the second space-efficient data structure sketch.

4. The system of claim 1, further comprising an extraction component that extracts the co-occurrence information from an input source and updates the first space-efficient data structure sketch and the second space-efficient data structure sketch.

5. The system of claim 1, wherein the first space-efficient data structure sketch is a sparse count sketch; and the second space-efficient data structure sketch is a sparse containment sketch.

6. The system of claim 5, wherein the storage component further comprises a reducing component that uses compressed sparse matrix representations to reduce a memory size of the first space-efficient data structure sketch and the second space-efficient data structure sketch.

7. The system of claim 6, wherein the first space-efficient data structure sketch is generated as a two-dimensional hash table of integer values, and the second space-efficient data structure sketch is a two-dimensional hash table of Boolean values.

8. The system of claim 1, wherein the computer executable components further comprise a generating component that generates the first space-efficient data structure sketch and the second space-efficient data structure sketch from a training document.

9. A computer implemented method, comprising:
receiving, using a processor operatively coupled to memory, results of a semantic structured query language (SQL) query;
loading, using the processor, a first space-efficient data structure sketch and a second space-efficient data structure sketch from a training document;
storing, using the processor, the first space-efficient data structure sketch and the second space-efficient data structure sketch in compressed serialized form; and
employing, using the processor, sparse hash-table based sketches to interpret the semantic SQL query result, wherein the employing comprises computing one or more interpretability scores via extracting co-occurrence information from the first space-efficient data structure sketch and extracting Boolean containment information from the second space-efficient data structure sketch.

10. The computer implemented method of claim 9, wherein the first space-efficient data structure sketch is a sparse count sketch; and the second space-efficient data structure sketch is a sparse containment sketch.

11. The computer implemented method of claim 9, wherein the first space-efficient data structure sketch is generated as a two-dimensional hash table of integer values, and the second space-efficient data structure sketch is a two-dimensional hash table of Boolean values.

12. The computer implemented method of claim 9, further comprising:
querying, using the processor, the second space-efficient data structure sketch for a bi-gram tuple; and
querying, using the processor, the first space-efficient data structure sketch for co-occurrence values of the bi-gram tuple in response to a true Boolean value from the query of the second space-efficient data structure sketch.

13. The computer implemented method of claim 12, further comprising:
updating, by the processor, the first space-efficient data structure sketch and the second space-efficient data structure sketch via the training document received by the processor.

14. The computer implemented method of claim 13, wherein the first space-efficient data structure sketch is a sparse count sketch; and the second space-efficient data structure sketch is a sparse sketch.

15. The computer implemented method of claim 14, wherein the first space-efficient data structure sketch is generated as a two-dimensional hash table of integer values, and the second space-efficient data structure sketch is a two-dimensional hash table of Boolean values.

16. A computer program product for interpreting semantic structured query results, the computer program product comprising a computer readable storage medium having program instructions embodied therewith, the program instructions executable by a processor to cause the processor to:
- receive, by the processor, results of a semantic structured query language (SQL) query; and
- load, by the processor, a first space-efficient data structure sketch and a second space-efficient data structure sketch from a training document;
- store, by the processor, the first space-efficient data structure sketch and the second space-efficient data structure sketch in a compressed serialized form;
- employ, using the processor, sparse hash-table based sketches to interpret the semantic SQL query result, wherein the employing comprises computing one or more interpretability scores via extracting co-occurrence information from the first space-efficient data structure sketch and extracting Boolean containment information from the second space-efficient data structure sketch.

17. The computer program product of claim 16, wherein the program instructions further cause the processor to:
- query, by the processor, the second space-efficient data structure sketch for a bi-gram tuple; and
- query, by the processor, the first space-efficient data structure sketch for co-occurrence values of the bi-gram tuple in response to a true Boolean value from the query of the second space-efficient data structure sketch.

18. The computer program product of claim 17, wherein the program instructions further cause the processor to:
- update, by the processor, the first space-efficient data structure sketch and the second space-efficient data structure sketch via the training document received by the processor.

19. The computer program product of claim 18, wherein the first space-efficient data structure sketch is a sparse count sketch; and the second space-efficient data structure sketch is a sparse sketch.

20. The computer program product of claim 19, wherein the first space-efficient data structure sketch is generated as a two-dimensional hash table of integer values, and the second space-efficient data structure sketch is a two-dimensional hash table of Boolean values.

* * * * *